United States Patent
Nakayama et al.

(10) Patent No.: US 9,185,298 B2
(45) Date of Patent: Nov. 10, 2015

(54) IMAGE BLUR CORRECTION APPARATUS, IMAGE BLUR CORRECTION METHOD, AND IMAGING APPARATUS

(71) Applicant: Sony Corporation, Tokyo (JP)

(72) Inventors: Tatsuyuki Nakayama, Kanagawa (JP); Kousuke Tsuchihashi, Kanagawa (JP); Hideo Takagi, Saitama (JP)

(73) Assignee: SONY CORPORATION, Tokyo (JP)

( * ) Notice: Subject to any disclaimer, the term of this patent is extended or adjusted under 35 U.S.C. 154(b) by 121 days.

(21) Appl. No.: 13/916,950

(22) Filed: Jun. 13, 2013

(65) Prior Publication Data

US 2013/0342715 A1 Dec. 26, 2013

(30) Foreign Application Priority Data

Jun. 22, 2012 (JP) .................................. 2012-141074

(51) Int. Cl.
H04N 5/232 (2006.01)

(52) U.S. Cl.
CPC ....... *H04N 5/23287* (2013.01); *H04N 5/23267* (2013.01)

(58) Field of Classification Search
CPC ............ H04N 5/2328; H04N 5/23287; H04N 5/23264; G03B 2205/0023
See application file for complete search history.

(56) References Cited

U.S. PATENT DOCUMENTS

| 5,537,180 | A * | 7/1996 | Matsumoto et al. ............. 396/52 |
| 2008/0037970 | A1* | 2/2008 | Saito et al. ...................... 396/55 |
| 2010/0315520 | A1* | 12/2010 | Noto et al. ............... 348/208.11 |
| 2011/0317987 | A1* | 12/2011 | Nakayama ...................... 396/55 |
| 2012/0063016 | A1* | 3/2012 | Imafuji et al. ................. 359/822 |
| 2013/0176629 | A1* | 7/2013 | Nakayama et al. ........... 359/696 |
| 2014/0160566 | A1* | 6/2014 | Shihoh .......................... 359/557 |

FOREIGN PATENT DOCUMENTS

JP 07-274056 10/1995

* cited by examiner

*Primary Examiner* — Lin Ye
*Assistant Examiner* — John H Morehead, III
(74) *Attorney, Agent, or Firm* — Hazuki International, LLC

(57) ABSTRACT

Provided is an image blur correction apparatus including a lens unit having an imaging optical system and an imaging unit configured to generate an image signal of a captured image, a blur detection unit configured to detect blurring occurring in the lens unit, a first correction unit configured to perform image blur correction by turning the lens unit in a first direction and in a second direction, a second correction unit configured to perform image blur correction on a captured image obtained by the imaging optical system, and an image blur correction control unit configured to drive the first correction unit and the second correction unit based on blurring detected by the blur detection unit.

13 Claims, 16 Drawing Sheets

IMAGE BLUR CORRECTION APPARATUS, IMAGE BLUR CORRECTION METHOD, AND IMAGING APPARATUS

CROSS-REFERENCE TO RELATED APPLICATION

The present application claims priority from Japanese Patent Application No. JP 2012-141074 filed in the Japanese Patent Office on Jun. 22, 2012, the entire content of which is incorporated herein by reference.

BACKGROUND

The present technology relates to an image blur correction apparatus, an image blur correction method, and an imaging apparatus that enable image blur correction performance to be improved.

In an imaging apparatus such as a video camera and a still camera, an image blur correction apparatus may be provided for correcting image blurring by moving a lens in a direction orthogonal to the light axis direction.

For example, in JP H7-274056A, a lens unit, which has a lens, is configured so that it can turn in a first direction about a first pivot axis that is orthogonal to the light axis of the lens with respect to an outer housing, and in a second direction that is a direction about a second pivot axis orthogonal to the light axis and the first pivot axis. Image blur correction is performed by the lens unit being turned in a yaw direction about the first pivot axis, and in a pitch direction about the second pivot axis. Further, in JP H7-274056A, as a drive unit for turning the lens unit in a yaw direction and a pitch direction, two drive motors (flat motors), each having a plurality of coil units, magnets, and yokes, are used.

SUMMARY

However, when correcting image blurring by turning the lens unit with drive motors in the yaw direction and the pitch direction, if the lens unit is heavy, its inertia is large, which makes it difficult to correct minute image blurring.

Further, when correcting image blurring by providing a correction lens for correcting image blurring in the lens unit and moving the correction lens based on the blurring occurring in the lens unit, if the movement amount of the correction lens is large, the optical performance can deteriorate, which may cause the quality of the captured image to deteriorate. Consequently, it is difficult to obtain a good-quality image corrected for image blurring when the image blurring is large.

According to an embodiment of the present technology, there is provided an image blur correction apparatus, an image blur correction method, and an imaging apparatus that are capable of improving image blur correction performance.

According to a first embodiment of the present technology, there is provided an image blur correction apparatus including a lens unit that has an imaging optical system and an imaging unit configured to generate an image signal of a captured image, a blur detection unit configured to detect blurring occurring in the lens unit, a first correction unit configured to perform image blur correction by turning the lens unit in a first direction, which is a direction about a first pivot axis that is orthogonal to a light axis of the imaging optical system, and in a second direction, which is a direction about a second pivot axis that is orthogonal to the light axis and the first pivot axis, a second correction unit configured to perform image blur correction on a captured image obtained by the imaging optical system, and an image blur correction control unit configured to drive the first correction unit and the second correction unit based on blurring detected by the blur detection unit.

According to an embodiment of the present technology, image blur correction is performed by detecting with a blur detection unit blurring occurring in a lens unit having an imaging optical system and an imaging unit that generates an image signal of a captured image, and turning a lens unit in a first direction, which is a direction about a first pivot axis that is orthogonal to a light axis of the imaging optical system, and in a second direction, which is a direction about a second pivot axis that is orthogonal to the light axis and the first pivot axis, by driving a first correction unit with an image blur correction control unit based on the detected blurring. Further, image blur correction is also performed on the captured image obtained by the imaging optical system by driving a second correction unit with the image blur correction control unit based on the detected blurring. With the second correction unit, image blur correction is performed on the captured image obtained by the imaging optical system by, for example, driving a correction lens provided in the lens unit in a direction orthogonal to the light axis of the imaging optical system. Further, image blur correction can also be performed on the captured image obtained by the imaging optical system by driving an image sensor in the imaging unit in a direction orthogonal to the light axis of the imaging lens. In addition, image blur correction can also be performed on the captured image obtained by the imaging optical system by cropping an image using an image signal generated by the imaging unit, and changing the image cropping area.

Further, in the image blur correction apparatus, a first blur detection sensor and a second blur detected sensor may be provided in the blur detection unit, and the first correction unit may be driven based on blurring detected by the first blur detection sensor, and the second correction unit driven based on blurring detected by the second blur detection sensor. In addition, an error between a position of the lens unit and a correction position in image blur correction by the first correction unit may be calculated by acquiring position information indicating the position of the lens unit from the first correction unit, and the second correction unit may be driven based on the calculated error. Still further, the image blur correction control unit image may limit the image blur correction performed by the first correction unit to a predetermined blur range, and make the second correction unit perform image blur correction on blurring that is beyond the predetermined blur range. The predetermined blur range is set based on, for example, the blurring occurring in the lens unit or a remaining amount of the battery that drives the image blur correction apparatus.

According to a second embodiment of the present technology, there is provided an image blur correction method including detecting blurring occurring in a lens unit that has an imaging optical system and an imaging unit configured to generate an image signal of a captured image, and driving, based on the detected blurring, a first correction unit that is configured to perform image blur correction by turning the lens unit in a first direction, which is a direction about a first pivot axis that is orthogonal to a light axis of the imaging optical system, and in a second direction, which is a direction about a second pivot axis that is orthogonal to the light axis and the first pivot axis, and a second correction unit that is configured to perform image blur correction on a captured image obtained by the imaging optical system.

According to a third embodiment of the present technology, there is provided an image blur correction apparatus including a lens unit that has an imaging optical system and an imaging unit configured to generate an image signal of a captured image, a blur detection unit configured to detect blurring occurring in the lens unit, a first correction unit configured to perform image blur correction by turning the lens unit in a first direction, which is a direction about a first pivot axis that is orthogonal to a light axis of the imaging optical system, and in a second direction, which is a direction about a second pivot axis that is orthogonal to the light axis and the first pivot axis, a second correction unit configured to perform image blur correction on a captured image obtained by the imaging optical system, an image blur correction control unit configured to drive the first correction unit and the second correction unit based on blurring detected by the blur detection unit, and a signal processing unit configured to perform signal processing of an image signal generated by the imaging unit.

According to the embodiments of the present technology, image blur correction is performed by detecting with a blur detection unit blurring occurring in a lens unit having an imaging optical system and an imaging unit that generates an image signal of a captured image, and turning a lens unit in a first direction, which is a direction about a first pivot axis that is orthogonal to a light axis of the imaging optical system, and in a second direction, which is a direction about a second pivot axis that is orthogonal to the light axis and the first pivot axis, by driving a first correction unit with an image blur correction control unit based on the detected blurring. Further, image blur correction is also performed on the captured image obtained by the imaging optical system by driving a second correction unit with the image blur correction control unit based on the detected blurring. Therefore, not only can the image blur correction range be widened by the first correction unit, but even when an error occurs in the image blur correction by the first correction unit, the error can be compensated for by the second correction unit. Accordingly, the image blur correction performance can be improved.

DETAILED DESCRIPTION OF THE EMBODIMENT(S)

Figure 1:
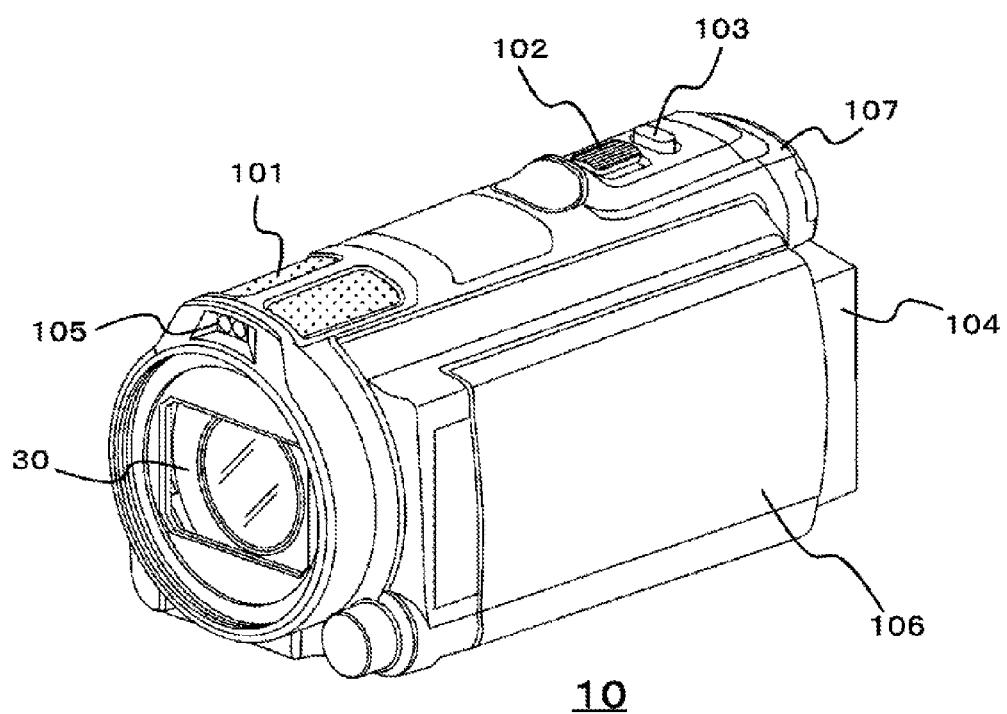
FIG. 1 is a diagram illustrating an appearance example of an imaging apparatus.
Figure 2:
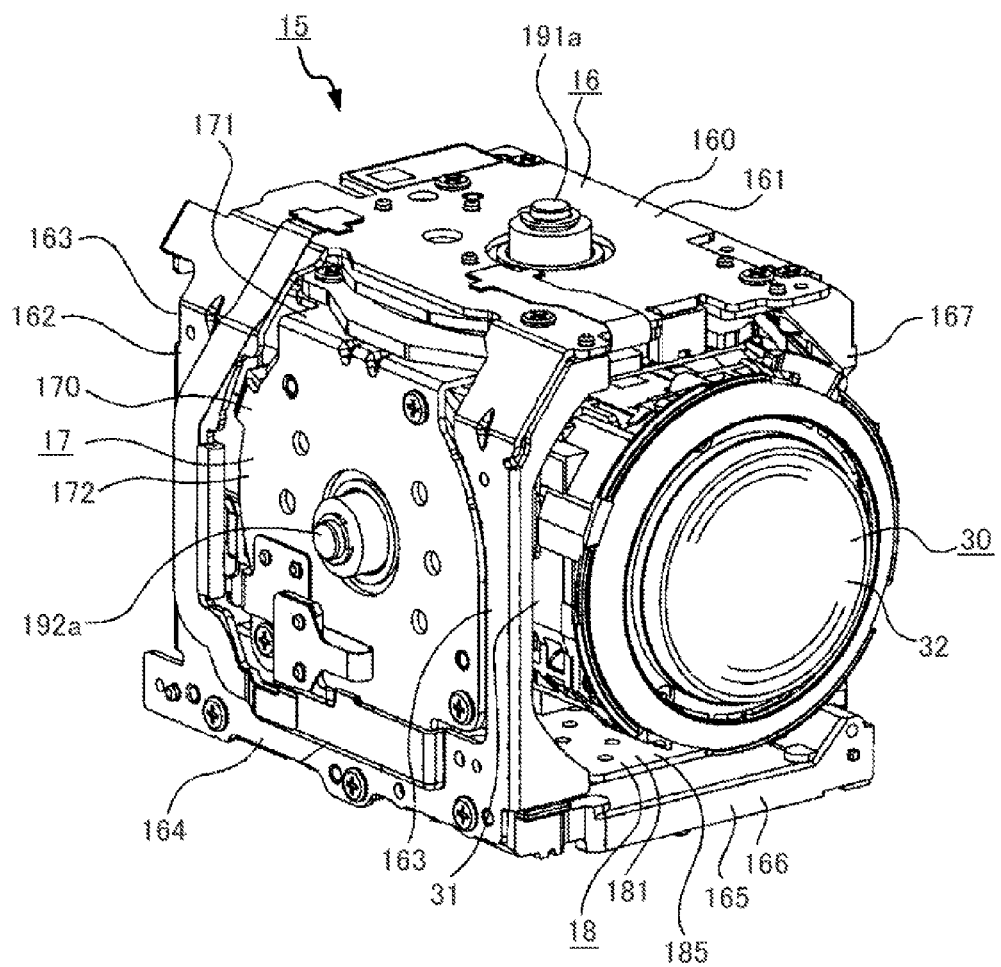
FIG. 2 is a perspective view illustrating a gimbal stabilization mechanism.
Figure 3:
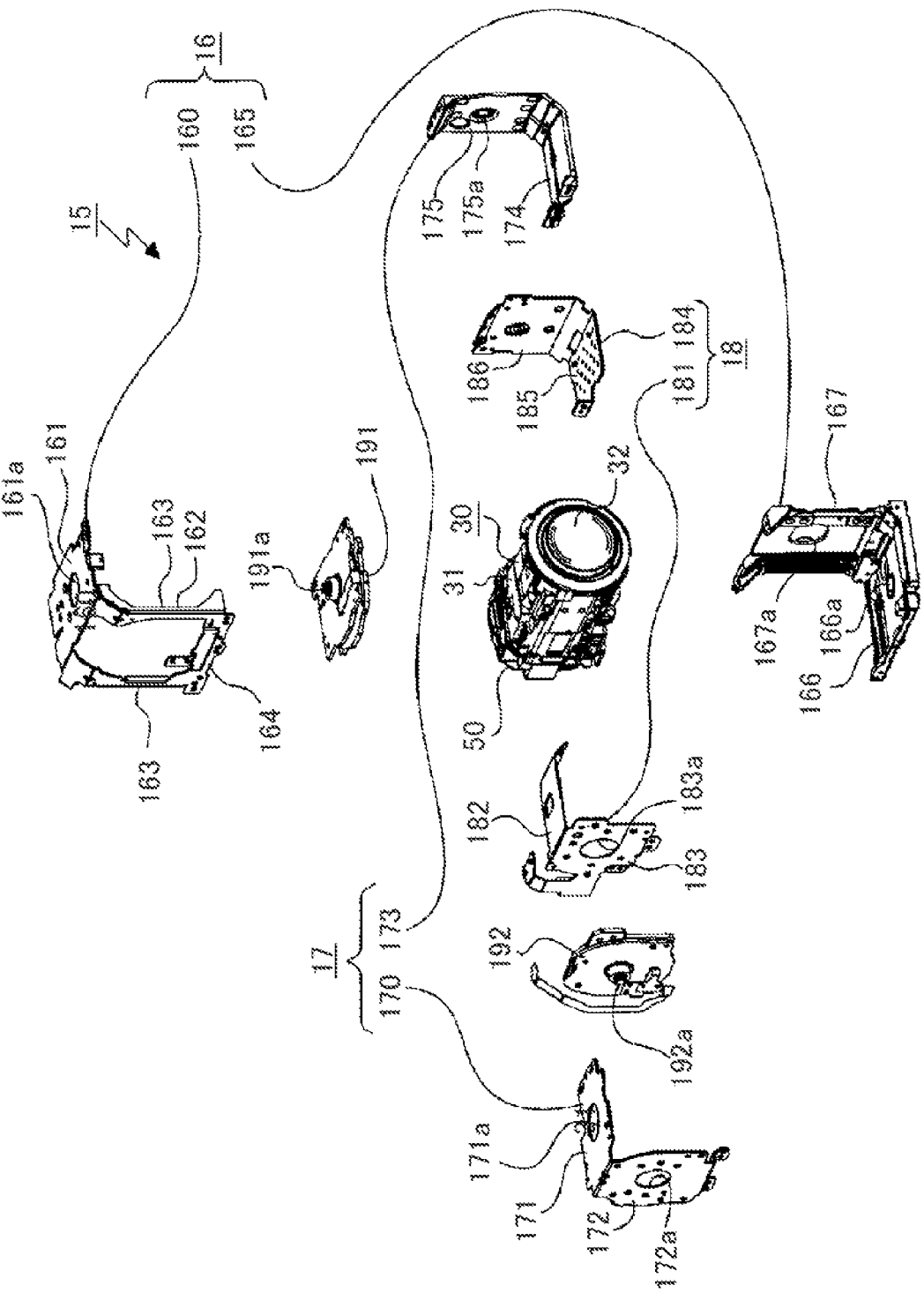
FIG. 3 is an exploded perspective view of a gimbal stabilization mechanism.
Figure 4:
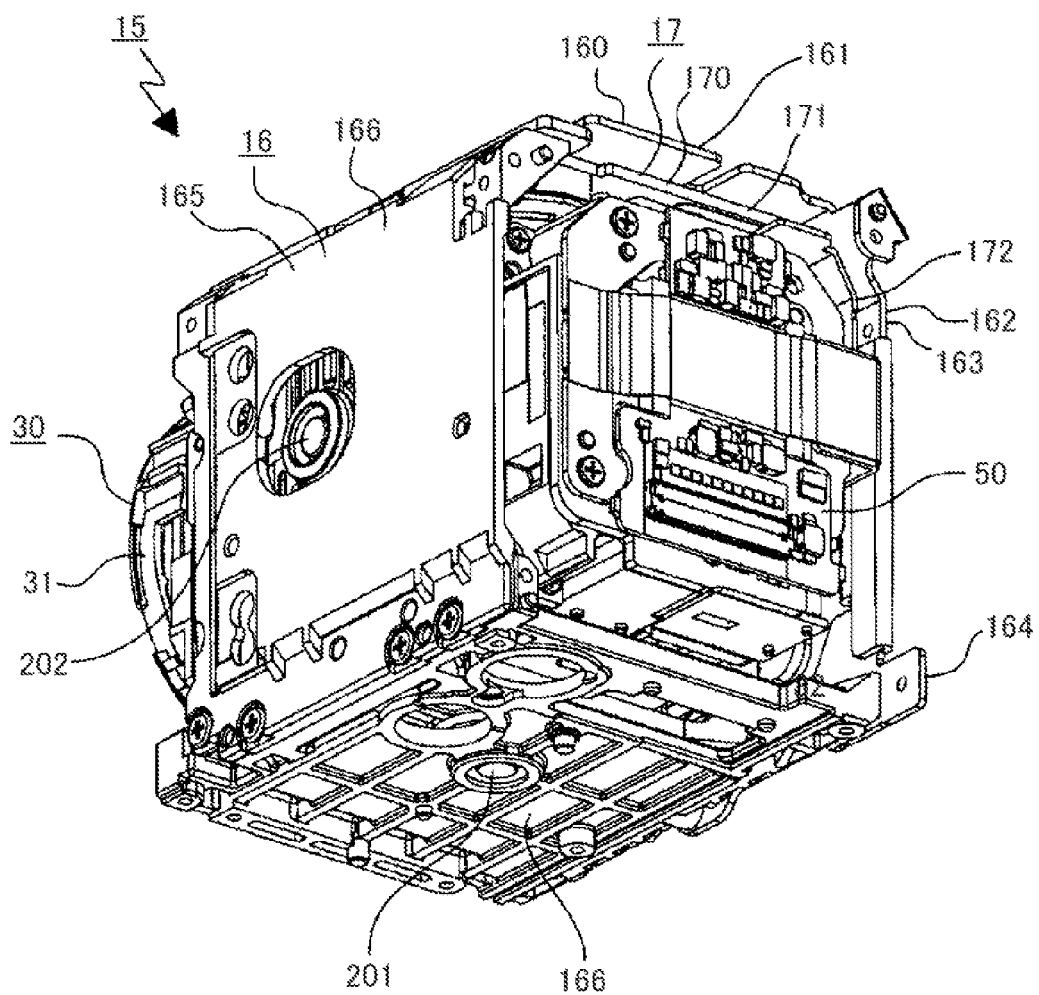
FIG. 4 is a perspective view of a gimbal stabilization mechanism as viewed from a different direction than in FIG. 2.
Figure 5:
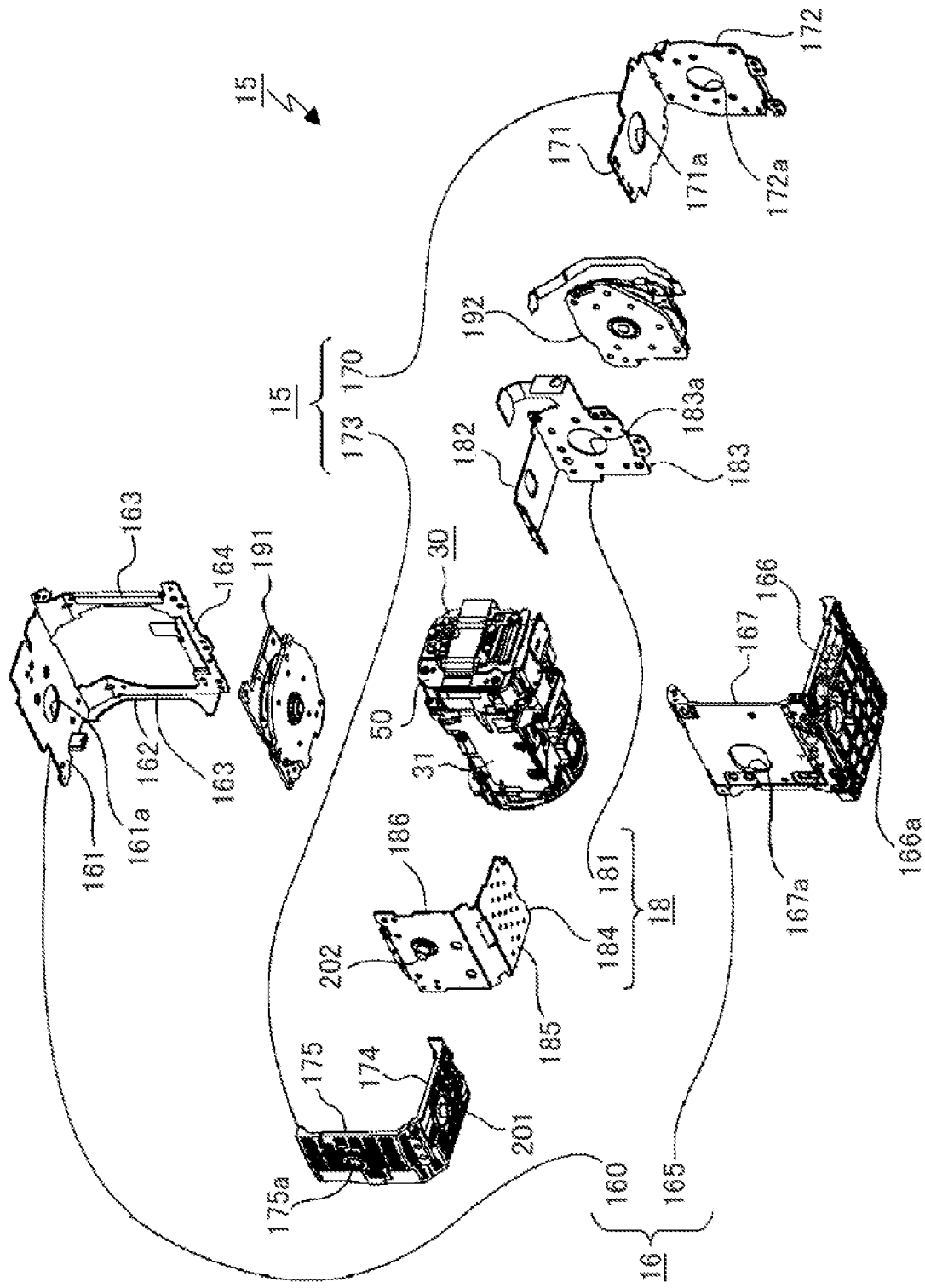
FIG. 5 is an exploded perspective view of a gimbal stabilization mechanism as viewed from a different direction than in FIG. 3.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments of the present disclosure for carrying out the present technology will now be described in the following order.

1. Imaging apparatus appearance example
2. Image blur correction apparatus configuration and operation
3. Imaging apparatus configuration
4. First configuration of an image blur correction control unit
5. Operation of the image blur correction control unit according to the first configuration
6. Second configuration of an image blur correction control unit
7. Operation of the image blur correction control unit according to the second configuration
8. Another operation of the image blur correction control unit according to the second configuration
9. Other imaging apparatus configurations and operations

1. Imaging Apparatus Appearance Example

FIG. 1 illustrates appearance example of an imaging apparatus, such as a video camera, that uses the image blur correction apparatus according to an embodiment of the present technology. It is noted that the image blur correction apparatus according to an embodiment of the present technology is not limited to a video camera, and can also be applied in a still camera and a mobile telephone or a communications terminal device having an imaging function.

A microphone 101, a zoom lens 102, an imaging button 103 and the like are arranged on an upper face of an imaging apparatus 10. A battery 104 is mounted on a rear face of the imaging apparatus 10. A flash 105 is arranged on an upper portion of the front face of the imaging apparatus 10. The flash 105 irradiates auxiliary light toward the front. A display panel unit 106 is turnably and rotatably coupled to a side face portion of the imaging apparatus 10. Further, a lens unit 30 is provided on a front portion of the imaging apparatus 10, and a finder unit 107 is coupled to a rear end portion.

2. Image Blur Correction Apparatus Configuration and Operation

The image blur correction apparatus has a lens unit, a blur detection unit, a first correction unit, a second correction unit, and an image blur correction control unit. The lens unit has an imaging optical system and an imaging unit that generates an image signal of a captured image. The blur detection unit detects blurring that occurring in the lens unit. The first correction unit performs image blur correction by turning the lens unit in a first direction, which is a direction about a first pivot axis that is orthogonal to a light axis of the imaging optical system, and in a second direction, which is a direction about a second pivot axis that is orthogonal to the light axis and the first pivot axis. The second correction unit performs image blur correction on the captured image obtained by the imaging optical system. In addition, the image blur correction control unit drives the first correction unit and the second correction unit based on blurring detected by the blur detection unit.

The first correction unit is configured using a gimbal stabilization mechanism, for example, that corrects image blur by turning the lens unit in a yaw direction and a pitch direction.

FIGS. 2 to 5 illustrate perspective views and exploded perspective views of a gimbal stabilization mechanism. A gimbal stabilization mechanism 15 has an outer frame 16, an inner frame 17, and a holding frame 18.

The outer frame 16 is configured from a first member 160 and a second member 165 that are coupled together.

The first member 160 is configured from a first face portion 161 that faces in a vertical direction and a second face portion 162 that faces in a horizontal direction, in which a right edge portion of the first face portion 161 is continuous with an upper edge portion of the second face portion 162. An insertion hole 161a is formed in a center portion of the first face portion 161. The second face portion 162 has a pair of pillar portions 163 that are longitudinally positioned and extend roughly vertically, and a connecting portion 164 that couples each lower edge portion of the pillars and extends longitudinally.

The second member 165 is configured from a first planar portion 166 that faces in a vertical direction and a second planar portion 167 that faces in a horizontal direction, in which a left edge portion of the first planar portion 166 is continuous with a lower edge portion of the second planar portion 167. An insertion hole 166a is formed in a center portion of the first planar portion 166. An insertion hole 167a is formed in a center portion of the second planar portion 167.

The lower edge portion of the second face portion 162 of the first member 160 and the right edge portion of the first planar portion 166 of the second member 165 are connected by a screw, for example.

The inner frame 17 is arranged on an inner side of the outer frame 16, and is configured from a first support member 170 and a second support member 173 that are coupled together.

The first support member 170 is configured from a top face portion 171 that faces in a vertical direction and a right side face portion 172 that faces in a horizontal direction, in which a right edge portion of the top face portion 171 is continuous with an upper edge portion of the right side face portion 172. An insertion arrangement hole 171a is formed in a center portion of the top face portion 171. An insertion arrangement hole 172a is formed in a center portion of the right side face portion 172.

The second support member 173 is configured from a bottom face portion 174 that faces in a vertical direction and a left side face portion 175 that faces in a horizontal direction, in which a left edge portion of the bottom face portion 174 is continuous with a lower edge portion of the left side face portion 175. An arrangement hole 175a is formed in a center portion of the left side face portion 175.

The lower edge portion of the right side face portion 172 of the first support member 170 and the right edge portion of the bottom face portion 174 of the second support member 173 are connected by a screw, for example. The left edge portion of the top face portion 171 of the first support member 170 and the right edge portion of the left side face portion 175 of the second support member 173 are connected by a screw, for example.

The holding frame 18 is arranged on an inner side of the inner frame 17, and is configured from a first attachment member 181 and a second attachment member 184 that are coupled together.

The first attachment member 181 is configured from an upper face portion 182 that faces in a vertical direction and a right side face portion 183 that faces in a horizontal direction, in which a right edge portion of the right side face portion 183 is continuous with an upper edge portion of the right side face portion 183. An insertion arrangement hole 183a is formed in a center portion of the right side face portion 183.

The second attachment member 184 is configured from a lower face portion 185 that faces in a vertical direction and a left side face portion 186 that faces in a horizontal direction, in which a left edge portion of the lower face portion 185 is continuous with a lower edge portion of the left side face portion 186. An attachment hole for attaching a countershaft 202 is formed in a center portion of the left side face portion 186.

The lower edge portion of the right side face portion 183 of the first attachment member 181 and the right edge portion of the lower face portion 185 of the second attachment member 184 are connected by a screw, for example. The left edge portion of the top face portion 182 of the first attachment member 181 and the right edge portion of the left side face portion 186 of the second attachment member 184 are connected by a screw, for example.

A lens unit 30, which is arranged on an inner side of the holding frame 18, has a lens barrel 31, an imaging optical system 32 that is configured from a plurality of lenses longitudinally arranged in a line in the lens barrel 31, and an imaging unit 50 that is attached to a rear end portion of the lens barrel 31. The lens barrel 31 is longitudinally configured in a long cylindrical shape. The imaging unit 50 has a (not illustrated) image sensor, such as a CCD (charge-coupled device) or a CMOS (complementary metal oxide semiconductor).

A first drive motor 191 is arranged above the lens unit 30. Further, a second drive motor 192 is arranged to the right of the lens unit 30. The first drive motor 191 and the second drive motor 192 are, for example, flat motors.

The countershaft 201 is attached to the attachment hole of the bottom face portion 174 of the inner frame 17. An upper end portion of the countershaft 201 is attached to the attachment hole, and the rest of the countershaft 201 other than the upper end portion protrudes downwards from the bottom face portion 174.

The countershaft 202 is attached to the attachment hole of the left side face portion 186 of the holding frame 18. A right end portion of the countershaft 202 is attached to the attachment hole, and the rest of the countershaft 202 other than the right end portion protrudes to the left from the left side face portion 186.

A bearing is inserted into and attached to the arrangement hole 166a of the first planar portion 166 of the outer frame 16. Further, a bearing is inserted into and attached to the arrangement hole 175a of the left side face portion 175 of the inner frame 17.

The holding frame 18 is attached by a screw, for example, to an outer periphery of the lens unit 30. When the holding frame 18 is attached to the lens unit 30, both longitudinal end portions of the lens unit 30 protrude longitudinally from the holding frame 18.

The second drive motor 192 is attached by a screw, for example, to an outer face of the right side face portion 183 on the holding frame 18, whereby the second drive motor 192 is arranged to the right of the holding frame 18.

The inner frame 17 is arranged on an outer periphery side of the holding frame 18. In a state in which the inner frame 17 is arranged on the outer periphery side of the holding frame 18, the countershaft 202 attached to the left side face portion 186 of the holding frame 18 is rotatably supported on a bearing inserted into the arrangement hole 175a of the left side face portion 175 of the inner frame 17.

The first drive motor 191 is attached by a screw, for example, to an upper face of the top face portion 171 on the inner frame 17, whereby the first drive motor 191 is arranged above the inner frame 17.

In a state in which the outer frame 16 is arranged on the outer periphery side of the inner frame 17, the countershaft 201 attached to the bottom face portion 174 of the inner frame 17 is rotatably supported on a bearing inserted into the arrangement hole 166a of the first planar portion 166 of the outer frame 16.

In the thus-configured gimbal stabilization mechanism 15, an axis linking the center axis of an output shaft 191a of the first drive motor 191 and the center axis of the countershaft 201 serves as a first pivot axis. Further, an axis linking the center axis of an output shaft 192a of the second drive motor 192 and the center axis of the countershaft 202 serves as a second pivot axis. Namely, in the gimbal stabilization mechanism 15, when the first drive motor 191 is driven, the lens unit 30 is driven in the yaw direction, and when the second drive motor 192 is driven, the lens unit 30 is driven in the pitch direction. It is noted that the gimbal stabilization mechanisms illustrated in FIGS. 2 to 5 are examples. As long as the lens unit is driven in the yaw direction and the pitch direction, the lens unit is not limited to the above-described configuration.

The second correction unit performs image blur correction on a captured image obtained from the imaging optical system. The second correction unit is configured using a lens shift stabilization mechanism that corrects image blurring by, for example, driving a correction lens provided in the lens unit 30 in a direction orthogonal to the light axis of the imaging optical system.

Figure 6:
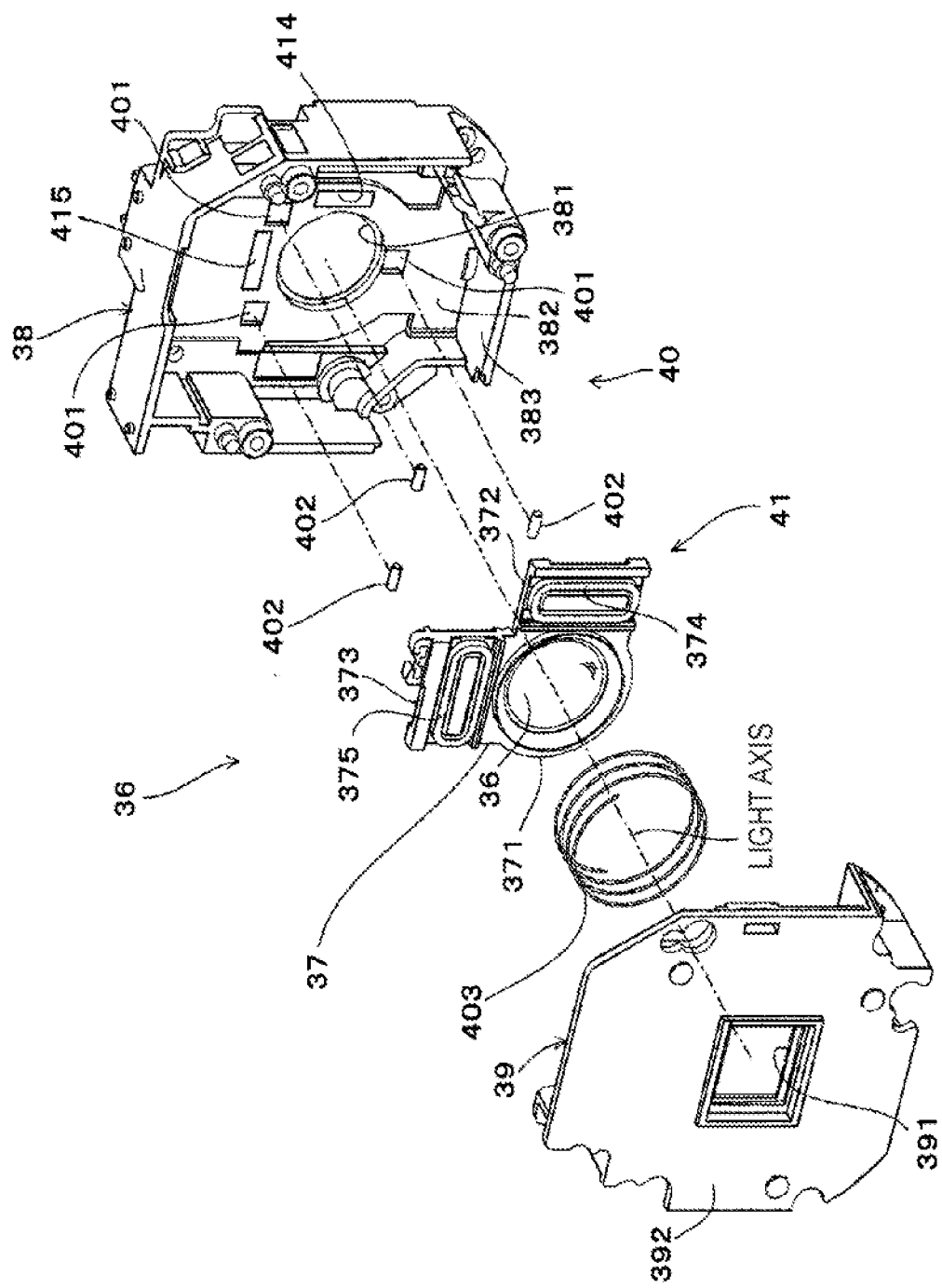
FIG. 6 is an exploded perspective view of a lens-shift stabilization mechanism.

FIG. 6 is an exploded perspective view of a lens-shift stabilization mechanism. A lens-shift stabilization mechanism 35 includes a correction lens 36, a correction lens holding frame 37, a base 38, a cover 39, a correction lens support mechanism 40, and a correction lens movement mechanism 41.

The correction lens 36 is driven on a plane orthogonal to the light axis of the lens unit 30 in an X-axis direction and a Y-axis direction, which are two directions orthogonal to each other, to correct shake of a target object formed on an imaging plane of the image sensor provided in the imaging unit 50.

The correction lens holding frame 37 includes a frame-shaped main body 371, and first and second bulge portions 372 and 373 that bulge out from the main body 371. In the present embodiment of the present disclosure, the correction lens holding frame 37 is integrally formed from a synthetic resin material.

The correction lens 36 is supported by the main body 371. The first bulge portion 372 is formed bulging out from one side of the main body 371 along the X direction toward the radial direction outer side of the correction lens 36. The second bulge portion 373 is formed bulging out from one side of the main body 371 along the Y direction in a direction that is orthogonal to the first bulge portion 372 from a position that is offset by a 90° phase.

The first and second bulge portions 372 and 373 are respectively attached to a first coil 374 and a second coil 374 on a face that opposes the cover 39.

The base 38 has a rear wall 382 and a side wall 383. The rear wall 382 has an opening 381 that is formed around the light axis in order to form a light path. The side wall 383 juts out toward the front from a periphery of the rear wall 382. It is noted that in the present embodiment of the present disclosure, the base 38 is integrally formed from a synthetic resin material.

First and second magnets 414 and 415 are mounted at a position on the rear wall 382 opposing the first and second coils 374 and 375, respectively.

In the present embodiment of the present disclosure, the correction lens movement mechanism 41 is configured from these coils 374 and 375 and the magnets 414 and 415.

The cover 39 has a front wall 392 in which an opening 391 is formed around the light axis in order to form a light path.

By assembling the base 38 and the cover 39, a housing space is provided in which the correction lens holding frame 37, the correction lens support mechanism 40, and the correction lens movement mechanism 41 are housed inside the assembly. The assembly of the base 38 and the cover 39 may be carried out by various known methods, such as joining with a screw, adhering with an adhesive and the like.

The correction lens support mechanism 40 includes three support portions 401, three rolling elements 402 respectively supported on the three support portions 401, and a maintenance device 403. The three support portions 401 are respectively provided at three (a plurality of) positions where the correction lens holding frame 37 and the base 38 oppose each other and that are spaced apart, so that the correction lens holding frame 37 is drivably supported in the orthogonal direction on the plane that is orthogonal to the light axis.

The maintenance device 403 maintains a fixed distance between the correction lens holding frame 37 and the base 38 along the light axis. The maintenance device 403 includes a coil spring that is provided between the correction lens holding frame 37 and the cover 39, and the three cylindrical rolling elements 402.

In the present embodiment of the present disclosure, there is one coil spring, which is formed with an inner diameter that is larger than the correction lens 36, and is arranged so that the imaging light path is positioned on the inner side of the coil spring.

The maintenance device 403 constantly urges the correction lens holding frame 37 in the base 38 direction, so that the distance between the correction lens holding frame 37 and the base 38 along the light axis is maintained at a fixed distance by this urging force.

In the present embodiment of the present disclosure, the three rolling elements 402 are supported by the respective support positions 401 without any jitter by the maintenance device 403.

It is noted that the maintenance device 403 is not limited the above-described configuration, various other configurations can be employed as long as the distance between the correction lens holding frame 37 and the base 38 along the light axis is maintained at a fixed distance. However, from the perspective of reducing the number of parts, a configuration like that described above is advantageous.

In the thus-configured lens-shift stabilization mechanism 35, the correction lens 36 is moved on the plane orthogonal to the light axis in an orthogonal direction by the coils 374 and 375 and the magnets 414 and 415.

The second correction unit is not limited to a lens-shift stabilization mechanism. For example, the second correction unit may be a configuration that corrects image blurring of a captured image by moving the image sensor in the imaging unit in a direction that is orthogonal to the light axis of the imaging optical system. In addition, the second correction unit may also be a configuration that performs electronic image blur correction for generating an image signal in which image blurring has been corrected by cropping an image using an image signal generated by the imaging unit, and changing the image cropping area.

3. Imaging Apparatus Configuration

Figure 7:
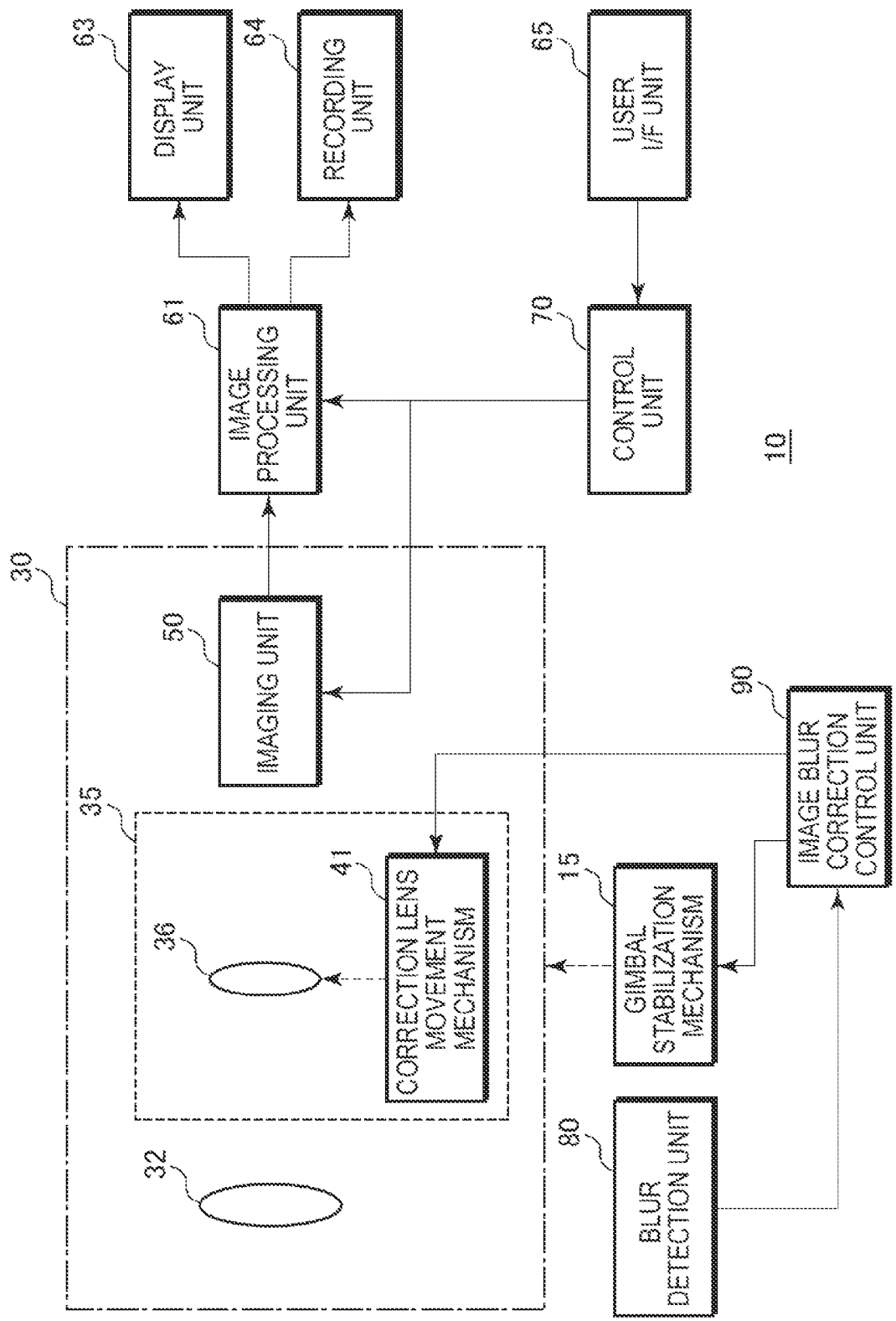
FIG. 7 is a diagram illustrating a configuration of an imaging apparatus.

FIG. 7 is a diagram illustrating a configuration of the imaging apparatus 10. It is noted that the imaging apparatus 10 uses a lens-shift stabilization mechanism as the second correction unit.

The imaging apparatus 10 has the lens unit 30, an image processing unit 61, a display unit 63, a recording unit 64, a user interface (user I/F) unit 65, and a control unit 70. Further, the imaging apparatus 10 also has the gimbal stabilization mechanism 15, a blur detection unit 80, and an image blur correction control unit 90. In addition, the imaging optical system 32, the lens-shift stabilization mechanism 35, and the imaging unit 50 are provided in the lens unit 30.

The imaging optical system 32 is configured from a focus lens, a zoom lens and the like. In the imaging optical system 32 the focal distance can be changed by, for example, moving a zoom lens in the light axis direction. Further, focus adjustment is performed by moving the focus lens in the light axis direction.

The lens-shift stabilization mechanism 35 corrects image blur by moving the correction lens 36 in the manner described above with the correction lens movement mechanism 41 in an orthogonal direction to the light axis based on a second drive signal from the below-described image blur correction control unit 90.

The imaging unit 50 is configured from an image sensor, a pre-processing unit, an imaging drive unit and the like. The image sensor converts an optical image formed on an imaging plane into an electric signal with the imaging optical system 32 and the correction lens 36 by performing photoelectric conversion processing. As the image sensor, a CCD (charge-coupled device) image sensor or a CMOS (complementary metal-oxide semiconductor) image sensor is used, for example. As the pre-processing, noise removal processing, such as CDS (correlated double sampling), is performed on the electric signals generated by the image sensor. Further, gain adjustment for setting the signal level of the electric signals to a desired signal level is performed. In addition, in the pre-processing, an analog image signal, which is an electric signal on which noise removal and gain adjustment processing has been performed, is converted into a digital image signal by performing A/D conversion processing, and the converted digital signal is output to the image processing unit 61. The imaging drive unit generates the operation pulses used for driving the image sensor based on a control signal from the below-described control unit 70. For example, the imaging drive unit generates a charge read pulse for reading charge, a transfer pulse for transfer in the vertical direction and the horizontal direction, a shutter pulse for performing an electronic shutter operation and the like.

The gimbal stabilization mechanism 15 corrects image blur by, based on a first drive signal from the below-described image blur correction control unit 90, turning the lens unit 30 in the yaw direction and the pitch direction in the manner described above.

The image processing unit 61 performs camera process processing and the like on the digital image signal output from the imaging unit 50. The image processing unit 61 performs on the image signal, for example, non-linear processing such as gamma correction or Knee correction, color correction processing, contour enhancement processing and the like. The image processing unit 61 outputs the processed image signal to the display unit 63 and the recording unit 64.

The display unit 63 is configured using the above-described display panel unit 106 and finder unit 107. The display unit 63 performs, for example, display of a camera through image based on the image signal output from the image processing unit 61. Further, the display unit 63 also performs menu display and operation state display for performing operation setting of the imaging apparatus 10. It is noted that when the display pixel number is less than the captured image, the display unit 63 performs processing for converting the captured image into a display image of the display pixel number.

The recording unit 64 records the image signal output from the image processing unit 61 on a recording medium. Examples of the recording medium include a detachable recording medium such as a memory card, an optical disc, or a magnetic tape, and a fixed type HDD (hard disk drive) or semiconductor memory module. Further, an encoder and a decoder may be provided in the recording unit 64 so that an encoded signal is recorded on the recording medium by performing compression encoding and decompression decoding of the image signal. It is noted that recorded images can be displayed on the display unit 63 by, in the recording unit 64, reading the image signals and encoded signals recorded on the recording medium.

The user interface (I/F) unit 65 is configured from, for example, the zoom lever 102 and imaging button 103 illustrated in FIG. 1. The user interface unit 65 generates an operation signal based on a user operation, and outputs the generated operation signal to the control unit 70.

The control unit 70 includes a CPU (central processing unit), a ROM (read-only memory), and a RAM (random access memory), for example. The CPU reads and executes control programs stored in the ROM as necessary. In the ROM, programs that are executed by the CPU and data that is necessary in the various processing processes, for example, are pre-stored. The RAM is a memory that is used as a so-called working area for temporarily storing mid-processing results. Further, the ROM or the RAM stores information and correction data, such as various setting parameters. The control unit 70 makes the imaging apparatus 10 perform an operation according to a user operation by controlling the various units based on an operation signal, for example, from the user interface unit 65.

The blur detection unit 80 detects blurring occurring in the imaging apparatus 10 (the lens unit 30), and outputs the detection result to the image blur correction control unit 90.

The image blur correction control unit 90 generates a drive signal based on the detection result from the blur detection unit 80, and supplies the generated drive signal to the gimbal stabilization mechanism 15 and the lens-shift stabilization mechanism 35, so that an image signal of the captured image in which image blurring has been corrected can be generated by the imaging unit 50.

4. First Configuration of an Image Blur Correction Control Unit

Figure 8:
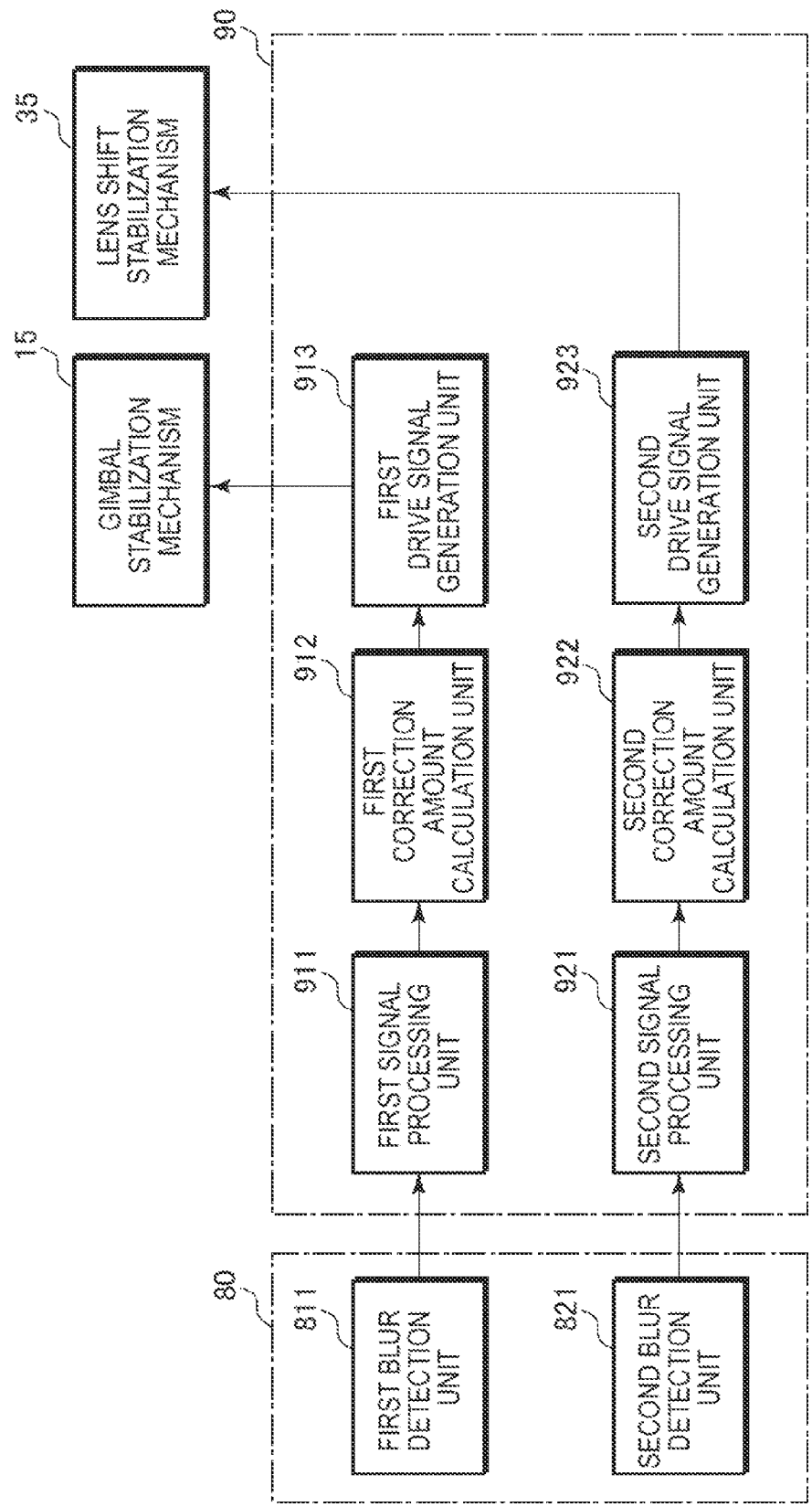
FIG. 8 is a diagram illustrating a first configuration of an image blur correction control unit.

Next, a first configuration of an image blur correction control unit will be described. FIG. 8 illustrates a first configuration of an image blur correction control unit.

The blur detection unit 80 has a first blur detection unit 811 and a second blur detection unit 821. The first blur detection unit 811, which is provided on the main portion of the imaging apparatus 10 (at a position on the blur correction apparatus excluding the lens unit 30), detects blurring and outputs a detection signal to the image blur correction control unit 90. The second blur detection unit 821, which is provided on the lens unit 30, detects blurring and outputs a detection signal to the image blur correction control unit 90. The first blur detection unit 811 and the second blur detection unit 821 are configured using an angular velocity sensor, for example.

The image blur correction control unit 90 has a first signal processing unit 911, a first correction amount calculation unit 912, and a first drive signal generation unit 913. Further, the image blur correction control unit 90 has a second signal processing unit 921, a second correction amount calculation unit 922, and a second drive signal generation unit 923.

The first signal processing unit 911 performs high-pass filter processing on the detection signal supplied from the first blur detection unit 811 in the blur detection unit 80, removes a noise component and a direct current component from the detection signal, and outputs the resultant signal to the first correction amount calculation unit 912.

The first correction amount calculation unit 912 calculates a first calculation amount based on the detection signal supplied from the first signal processing unit 911. The first correction amount calculation unit 912 performs on the detection signal integration processing and gain adjustment of the integration result, and calculates an angular displacement of the imaging apparatus 10. Further, the first correction amount calculation unit 912 adjusts the phase of a signal representing the angular displacement, and based on the phase-adjusted signal, calculates a first correction amount for correcting image blurring, namely, the rotation direction and the rotation angle for setting the lens unit 30 at a correction position where image blur is corrected. The first correction amount calculation unit 912 outputs the calculated first correction amount to the first drive signal generation unit 913.

The first drive signal generation unit 913 generates a first drive signal based on the first correction amount, and outputs the generated first drive signal to the gimbal stabilization mechanism 15. The first drive signal generation unit 913 generates a first drive signal for driving the drive motors 191 and 192 of the gimbal stabilization mechanism 15 based on the first correction amount, outputs the generated first drive signal to the gimbal stabilization mechanism 15, and rotates the lens unit 30 to the correction position.

The second signal processing unit 921 performs high-pass filter processing on the detection signal supplied from the second blur detection unit 821 in the blur detection unit 80, removes a noise component and a direct current component from the detection signal, and outputs the resultant signal to the second correction amount calculation unit 922.

The second correction amount calculation unit 922 calculates a second calculation amount based on the detection signal supplied from the second signal processing unit 921. The second correction amount calculation unit 922 performs on the detection signal integration processing and gain adjustment of the integration result, and calculates an angular displacement of the imaging apparatus 10. Further, the second correction amount calculation unit 922 adjusts the phase of a signal representing the angular displacement, and based on the phase-adjusted signal, calculates a second correction amount for correcting image blurring, namely, the movement direction and the movement amount for setting the correction lens 36 of the lens-shift stabilization mechanism at a correction position where image blur is corrected. The second correction amount calculation unit 922 outputs the calculated second correction amount to the second drive signal generation unit 923.

The second drive signal generation unit 923 generates a second drive signal based on the second correction amount, and outputs the generated second drive signal to the lens-shift stabilization mechanism 35. The second drive signal generation unit 923 generates a second drive signal for supplying to the coils 374 and 375 of the correction lens movement mechanism 41 based on the second correction amount, outputs the generated second drive signal to the lens-shift stabilization mechanism 35, and moves the correction lens 36 to the correction position.

Figure 9:
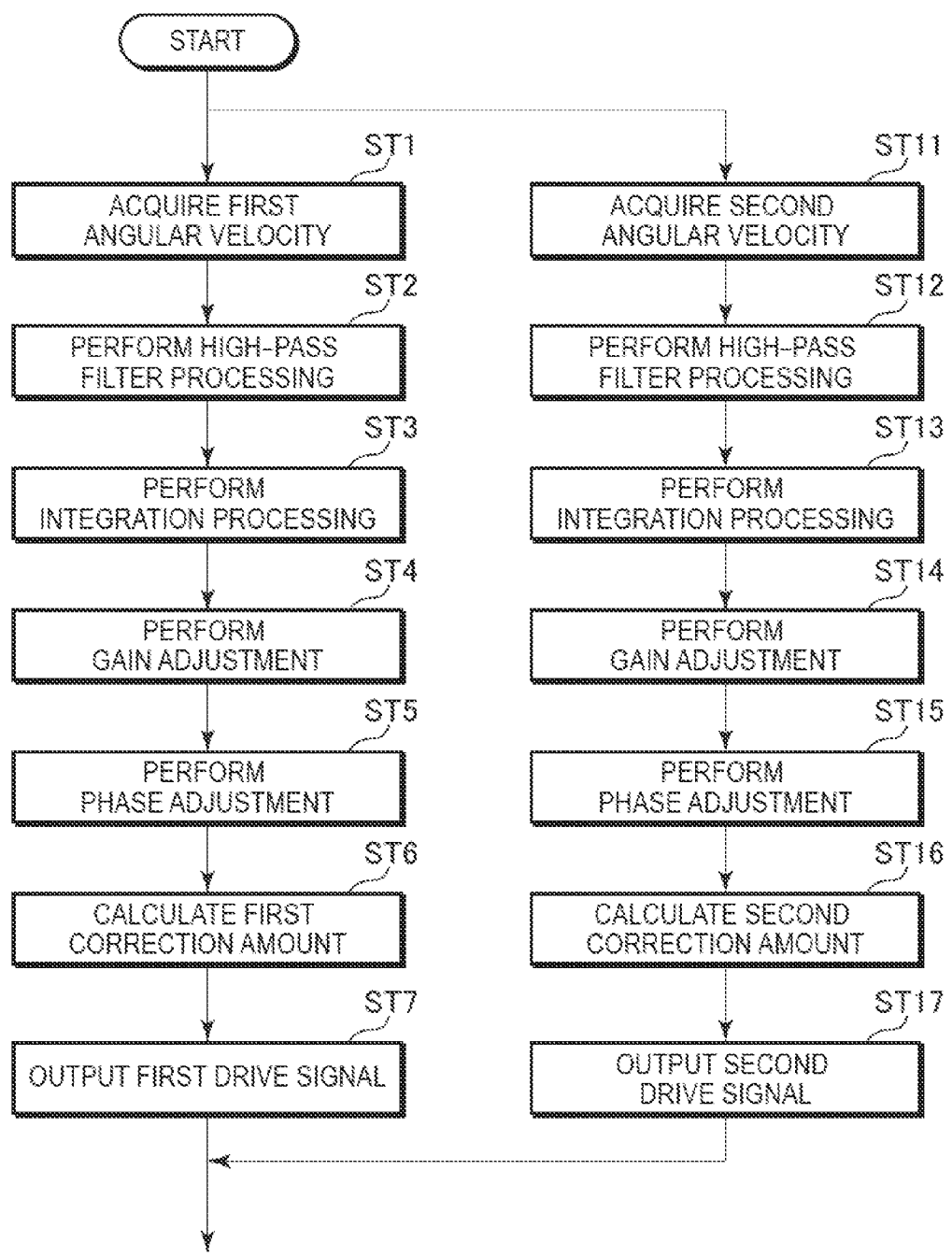
FIG. 9 is a flowchart illustrating an image blur correction operation according to the first configuration.

5. Operation of the Image Blur Correction Control Unit According to the First Configuration Next, operation of the image blur correction control unit according to the first configuration will be described. FIG. 9 is a flowchart illustrating an image blur correction operation according to the first configuration. In step ST1, the image blur correction control unit 90 acquires a first angular velocity. The image blur correction control unit 90 acquires an angular velocity, which is a detection result of a change in orientation in the yaw direction and the pitch direction of the imaging apparatus 10 from the first blur detection unit 811 that is configured using a first angular velocity sensor, for example, and the processing then proceeds to step ST2.

In step ST2, the image blur correction control unit performs high-pass filter processing. The image blur correction control unit 90 performs high-pass filter processing on the angular velocity signal, removes the noise component and direct current component, and the processing then proceeds to step ST3.

In step ST3, the image blur correction control unit 90 performs integration processing. The image blur correction control unit 90 integrates the angular velocity signal subjected to high-pass filter processing, and the processing then proceeds to step ST4.

In step ST4, the image blur correction control unit performs gain adjustment. The image blur correction control unit 90 adjusts the gain of the integration result, generates a signal representing the angular displacement of the imaging apparatus 10, and the processing then proceeds to step ST5.

In step ST5, the image blur correction control unit performs phase adjustment. The image blur correction control unit 90 adjusts the phase of the signal representing the angular displacement, and the processing then proceeds to step ST6.

In step ST6, the image blur correction control unit calculates the first correction amount. The image blur correction control unit 90 calculates the first correction amount based on the phase-adjusted signal of the signal representing the angular displacement, and the processing then proceeds to step ST7.

In step ST7, the image blur correction control unit 90 outputs the first drive signal. The image blur correction control unit 90 generates and outputs the first drive signal for driving the drive motors 191 and 192 of the gimbal stabilization mechanism 15 based on the first correction amount.

In step ST11, the image blur correction control unit 90 acquires a second angular velocity. The image blur correction control unit 90 acquires an angular velocity, which is a detection result of a change in orientation in the yaw direction and the pitch direction of the imaging apparatus 10 from the second blur detection unit 812 that is configured using a second angular velocity sensor, for example, and the processing then proceeds to step ST12.

In step ST12, the image blur correction control unit 90 performs high-pass filter processing. The image blur correction control unit 90 performs high-pass filter processing on the angular velocity signal, removes the noise component and direct current component, and the processing then proceeds to step ST13.

In step ST13, the image blur correction control unit 90 performs integration processing. The image blur correction control unit 90 integrates the angular velocity signal subjected to high-pass filter processing, and the processing then proceeds to step ST14.

In step ST14, the image blur correction control unit 90 performs gain adjustment. The image blur correction control unit 90 adjusts the gain of the integration result, generates a signal representing the angular displacement of the imaging apparatus 10, and the processing then proceeds to step ST15.

In step ST15, the image blur correction control unit 90 performs phase adjustment. The image blur correction control unit 90 adjusts the phase of the signal representing the angular displacement, and the processing then proceeds to step ST16.

In step ST16, the image blur correction control unit 90 calculates the second correction amount. The image blur correction control unit 90 calculates the second correction amount based on the phase-adjusted signal of the signal representing the angular displacement, and the processing then proceeds to step ST17.

In step ST17, the image blur correction control unit 90 outputs the second drive signal. The image blur correction control unit 90 generates and outputs the second drive signal to be supplied to the coils 374 and 375 of the correction lens movement mechanism 41 in the lens-shift stabilization mechanism 35 based on the second correction amount.

It is noted that, in the image blur correction operation, the calculation of the correction amounts is not restricted to the processing order illustrated in the flowchart, as long as the first correction amount and the second correction amount are calculated. Further, the above-described flowchart illustrates an example of a processing order for a case in which an angular velocity sensor is used. If some other device is used to detect the blurring occurring in the imaging apparatus 10, the correction amounts may be calculated by performing processing based on that other device.

Figure 10:
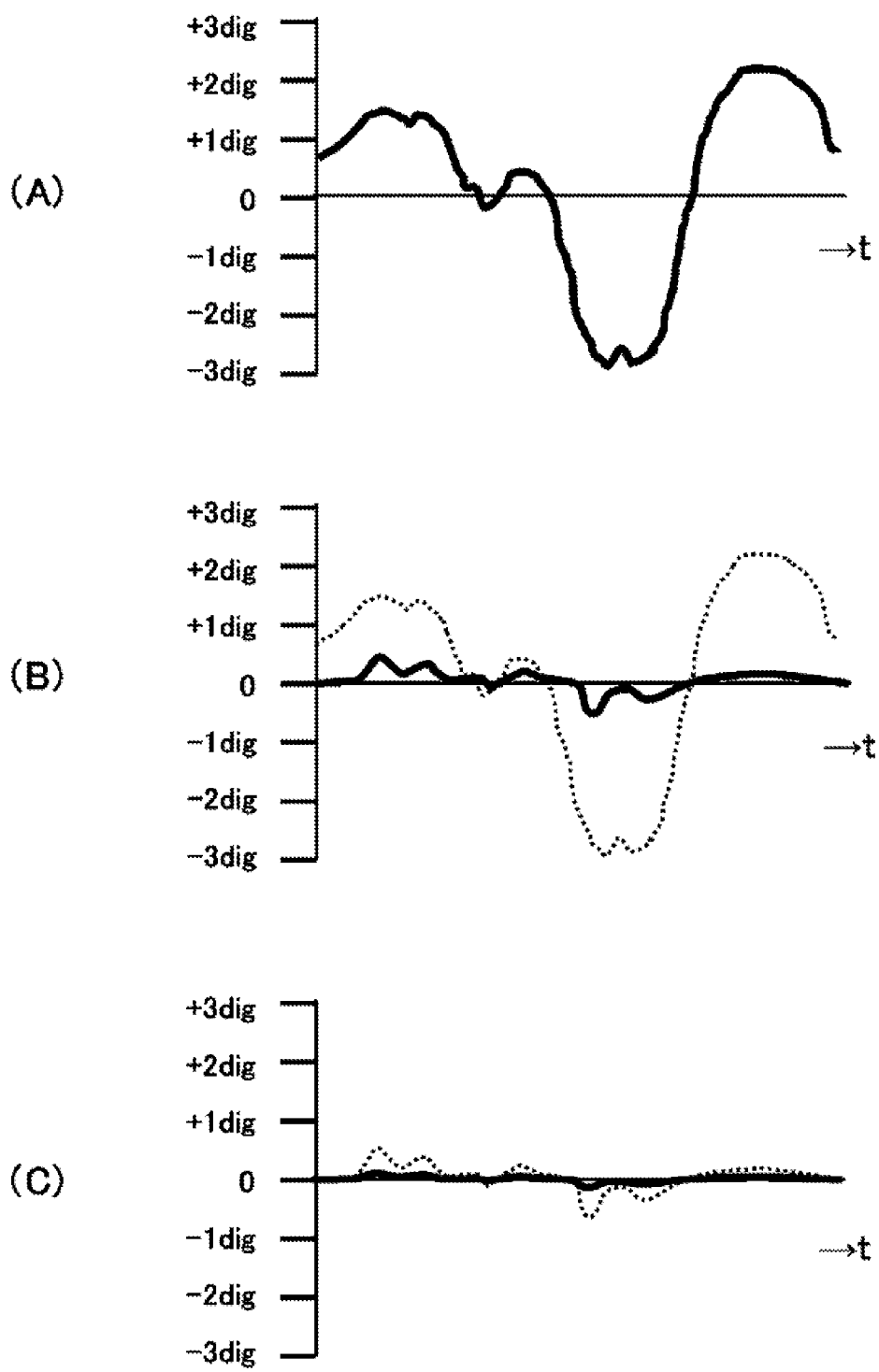
FIG. 10 is a diagram illustrating an example of an image blur correction operation.

FIG. 10 illustrates an example of an image blur correction operation. FIG. 10A illustrates a state in which image blur correction has not been performed, FIG. 10B illustrates a state in which image blur correction has been performed using only a gimbal stabilization mechanism, and FIG. 10C illustrates a state in which image blur correction has been performed using a gimbal stabilization mechanism and a lens-shift stabilization mechanism.

When image blur correction has been performed using only a gimbal stabilization mechanism, due to the inertia and the like of the lens unit 30, it is difficult to correct minute image blurring. Therefore, as illustrated by the solid line in FIG. 10B, residual blurring can remain for minute image blur correction. It is noted that the dashed line in FIG. 10B indicates the state before image blur correction. However, when image blur correction is performed like in an embodiment of the present technology using a gimbal stabilization mechanism and a lens-shift stabilization mechanism, minute image blurring is corrected by the lens-shift stabilization mechanism, so that as illustrated by the solid line in FIG. 10C, image blurring can be accurately corrected. It is noted that the dashed line in FIG. 10C indicates the state when image blur correction has been performed using only a gimbal stabilization mechanism.

Thus, according to an embodiment of the present technology, the blur range of an imaging apparatus for which image blur correction can be carried out by using a gimbal stabilization mechanism is widened. Further, since the image blur correction using the lens-shift stabilization mechanism is carried out in parallel, minute image blurring that could not be corrected with the gimbal stabilization mechanism can be corrected. Therefore, image blur correction performance can be improved.

Further, since minute image blurring that could not be corrected with the gimbal stabilization mechanism can be corrected with the lens-shift stabilization mechanism, even if the rotation position detection accuracy of the lens unit by the gimbal stabilization mechanism is rough, image blurring can be accurately corrected. Namely, even if position detection accuracy deteriorates due to the position detection sensor that detects the rotation position being brought closer to the rotation axis, the effect due to the deterioration in rotation position detection accuracy can be compensated for by the lens-shift stabilization mechanism, so that the gimbal stabilization mechanism can be made more compact.

In addition, since the gimbal stabilization mechanism is specially adapted to correction of large image blurring, because the angular velocity used for correction can be reduced, this enables the torque of the actuator to be reduced, so that the gimbal stabilization mechanism can be made more compact.

Moreover, since a blur detection unit is provided for the gimbal stabilization mechanism and the lens-shift stabilization mechanism, respectively, the first blur detection unit 811 may be adapted for a detection characteristic that is based on image blur correction performance of the gimbal stabilization mechanism, and the second blur detection unit 821 may be adapted for a detection characteristic that is based on image blur correction performance of the lens-shift stabilization mechanism. For example, since a gimbal stabilization mechanism has a wider image blur correction range than a lens-shift stabilization mechanism, a sensor having a wider blur detection range may be used for the blur detection sensor used by the first blur detection unit 811 than for the blur detection sensor used by the second blur detection unit 821. Further, since a lens-shift stabilization mechanism can correct minute image blurring, a sensor having a high blur detection accuracy is used for the blur detection sensor that is used by the second blur detection unit 821. By using such a sensor, image blur correction can be carried out even better.

Still further, in the first configuration, the first blur detection unit 811 is provided on the main portion of the imaging apparatus 10 (i.e., at a position on the blur correction apparatus excluding the lens unit 30), and the second blur detection unit 821 is provided on the lens unit 30. The gimbal stabilization mechanism performs blur correction of blurring detected by the first blur detection unit 811, and the lens-shift stabilization mechanism performs blur correction of the blurring detected by the second blur detection unit 821. Therefore, residual blurring by the gimbal stabilization mechanism can be appropriately corrected by lens-shift stabilization mechanism.

6. Second Configuration of an Image Blur Correction Control Unit

Figure 11:
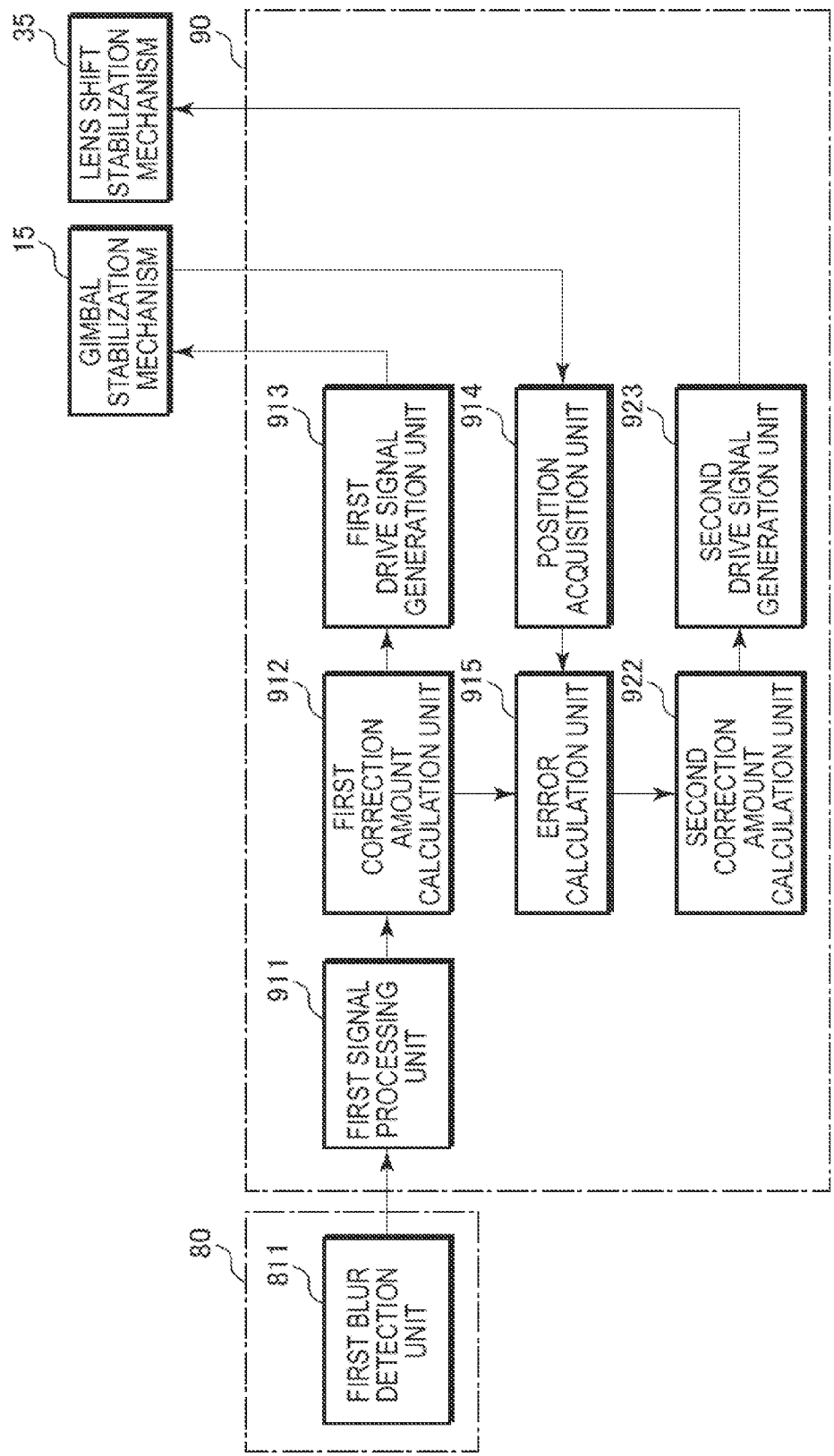
FIG. 11 is a diagram illustrating a second configuration of an image blur correction control unit.

Next, a second configuration of the image blur correction control unit will be described. FIG. 11 illustrates a second configuration of an image blur correction control unit.

In the second configuration, the blur detection unit 80 only has the first blur detection unit 811. The first blur detection unit 811 detects blurring occurring in the imaging apparatus 10 (lens unit 30). The first blur detection unit 811 is configured using an angular velocity sensor, for example. The first blur detection unit 811 detects changes in orientation in the yaw direction and the pitch direction of the imaging apparatus 10, and outputs a detection signal to the image blur correction control unit 90.

The image blur correction control unit 90 has a first signal processing unit 911, a first correction amount calculation unit 912, and a first drive signal generation unit 913. Further, the image blur correction control unit 90 has a position acquisition unit 914, an error calculation unit 915, a second correction amount calculation unit 922, and a second drive signal generation unit 923.

The first signal processing unit 911 performs high-pass filter processing on the detection signal supplied from the first blur detection unit 811 in the blur detection unit 80, removes a noise component and a direct current component from the detection signal, and outputs the resultant signal to the first correction amount calculation unit 912.

The first correction amount calculation unit 912 calculates a first calculation amount based on the detection signal supplied from the first signal processing unit 911. The first correction amount calculation unit 912 performs on the detection signal integration processing and gain adjustment of the integration result, and calculates an angular displacement of the imaging apparatus 10. Further, the first correction amount calculation unit 912 adjusts the phase of a signal representing the angular displacement, and based on the phase-adjusted signal, calculates a first correction amount for correcting image blurring, namely, the rotation direction and the rotation angle for setting the lens unit 30 at a correction position where image blur is corrected. The first correction amount calculation unit 912 outputs the calculated first correction amount to the first drive signal generation unit 913 and the error calculation unit 915.

The first drive signal generation unit 913 generates a first drive signal based on the first correction amount, and outputs the generated first drive signal to the gimbal stabilization mechanism 15. The first drive signal generation unit 913 generates a first drive signal for driving the drive motors 191 and 192 of the gimbal stabilization mechanism 15 based on the first correction amount, outputs the generated first drive signal to the gimbal stabilization mechanism 15, and rotates the lens unit 30 to the correction position.

The position acquisition unit 914 acquires position information indicating the current position (rotation position) of the lens unit 30 from the gimbal stabilization mechanism 15, and outputs the acquired position information to the error calculation unit 915.

The error calculation unit 915 calculates an error, namely, a correction error, between the correction position and the position information acquired by the position acquisition unit 914 (error in the rotation position of the lens unit 30) based on the first correction amount calculated by the first correction amount calculation unit 912. The error calculation unit 915 outputs the calculated correction error to the second correction amount calculation unit 922.

The second correction amount calculation unit 922 adjusts the gain of the correction error supplied from the error calculation unit 915, and sets the adjusted correction error as the angular displacement of the imaging apparatus 10 to be corrected by the lens-shift stabilization mechanism. Further, the second correction amount calculation unit 922 adjusts the phase of a signal representing the angular displacement, and based on the phase-adjusted signal, calculates a second correction amount for correcting image blurring, namely, the movement direction and the movement amount for setting the correction lens 36 of the lens-shift stabilization mechanism 35 at a correction position where image blur is corrected. The second correction amount calculation unit 922 outputs the calculated second correction amount to the second drive signal generation unit 923.

The second drive signal generation unit 923 generates a second drive signal based on the second correction amount, and outputs the generated second drive signal to the lens-shift stabilization mechanism 35. The second drive signal generation unit 923 generates a second drive signal for supplying to the coils 374 and 375 of the correction lens movement mechanism 41 based on the second correction amount, outputs the generated second drive signal to the lens-shift stabilization mechanism 35, and moves the correction lens 36 to the correction position.

Figure 12:
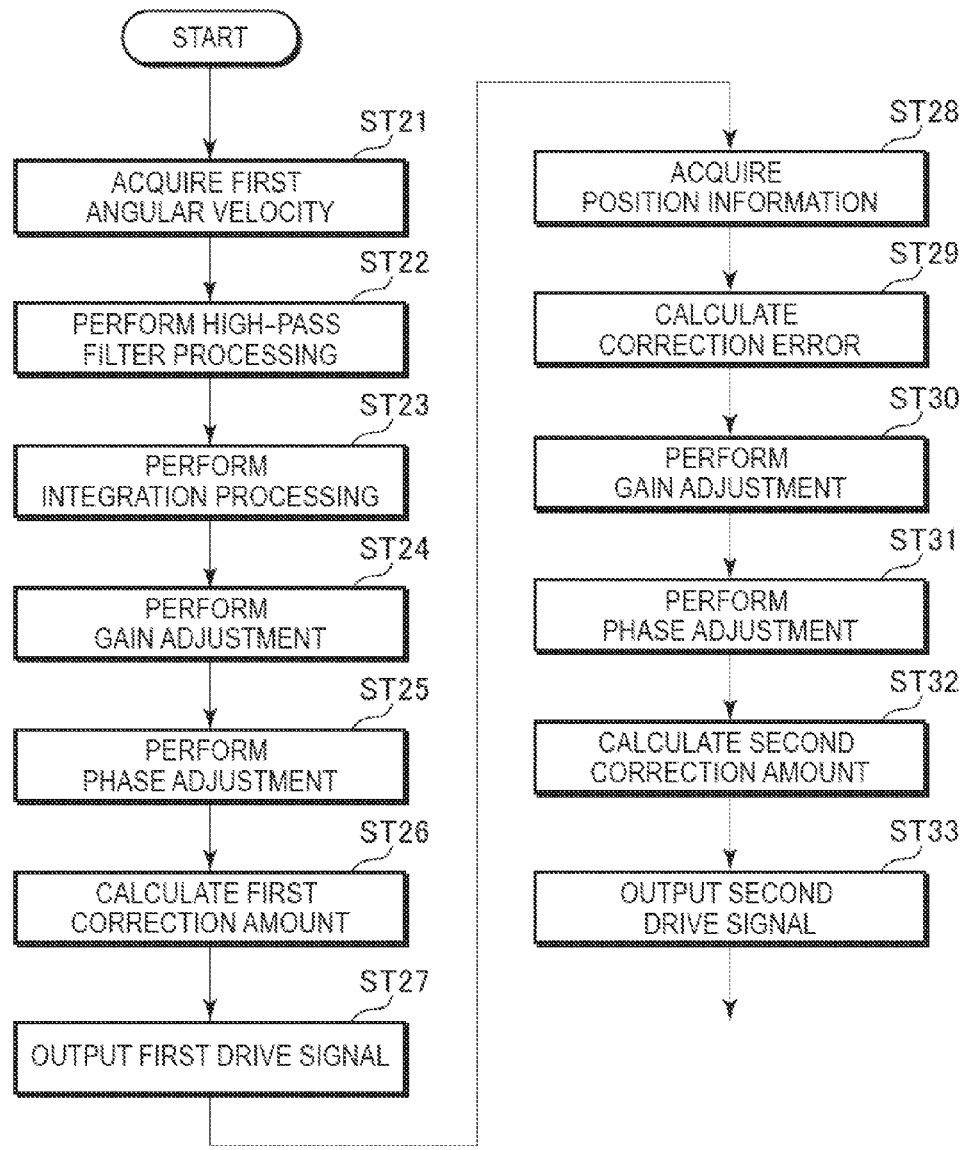
FIG. 12 is a flowchart illustrating an image blur correction operation according to the second configuration.

7. Operation of the Image Blur Correction Control Unit According to the Second Configuration Next, operation of the image blur correction control unit according to the second configuration will be described. FIG. 12 is a flowchart illustrating an image blur correction operation according to the second configuration. In step ST21, the image blur correction control unit 90 acquires a first angular velocity. The image blur correction control unit 90 acquires an angular velocity, which is a detection result of a change in orientation in the yaw direction and the pitch direction of the imaging apparatus 10 from the first blur detection unit 811 that is configured using a first angular velocity sensor, for example, and the processing then proceeds to step ST22.

In step ST22, the image blur correction control unit 90 performs high-pass filter processing. The image blur correction control unit 90 performs high-pass filter processing on the angular velocity signal, removes the noise component and direct current component, and the processing then proceeds to step ST23.

In step ST23, the image blur correction control unit 90 performs integration processing. The image blur correction control unit 90 integrates the angular velocity signal subjected to high-pass filter processing, and the processing then proceeds to step ST24.

In step ST24, the image blur correction control unit 90 performs gain adjustment. The image blur correction control unit 90 adjusts the gain of the integration result, generates a signal representing the angular displacement of the imaging apparatus 10, and the processing then proceeds to step ST25.

In step ST25, the image blur correction control unit 90 performs phase adjustment. The image blur correction control unit 90 adjusts the phase of the signal representing the angular displacement, and the processing then proceeds to step ST26.

In step ST26, the image blur correction control unit 90 calculates the first correction amount. The image blur correction control unit 90 calculates the first correction amount based on the phase-adjusted signal of the signal representing the angular displacement, and the processing then proceeds to step ST27.

In step ST27, the image blur correction control unit 90 outputs the first drive signal. The image blur correction control unit 90 generates and outputs the first drive signal for driving the drive motors 191 and 192 of the gimbal stabilization mechanism 15 based on the first correction amount, and the processing then proceeds to step ST28.

In step ST28, the image blur correction control unit 90 acquires position information. The image blur correction control unit 90 acquires position information indicating the current position of the lens unit 30, and the processing then proceeds to step ST29.

In step ST29, the image blur correction control unit 90 calculates a correction error. The image blur correction control unit 90 calculates a correction error from the correction position based on the calculated first correction amount and the current position indicated by the acquired position information, and the processing then proceeds to step ST30.

In step ST30, the image blur correction control unit 90 performs gain adjustment. The image blur correction control unit 90 adjusts the gain of the correction error, generates a signal representing the angular displacement of the imaging apparatus 10 to be corrected by the lens-shift stabilization mechanism, and the processing then proceeds to step ST31.

In step ST31, the image blur correction control unit 90 performs phase adjustment. The image blur correction control unit 90 adjusts the phase of the signal representing the angular displacement, and the processing then proceeds to step ST32.

In step ST32, the image blur correction control unit 90 calculates the second correction amount. The image blur correction control unit 90 calculates the first correction amount based on the phase-adjusted signal of the signal representing the angular displacement, and the processing then proceeds to step ST33.

In step ST33, the image blur correction control unit 90 outputs the second drive signal. The image blur correction control unit 90 generates and outputs the second drive signal to be supplied to the coils 374 and 375 of the correction lens movement mechanism 41 in the lens-shift stabilization mechanism 35 based on the second correction amount.

Thus, with the second configuration, a correction error is calculated from the correction position when image blur correction was performed with the gimbal stabilization mechanism and the current position of the lens unit 30, and image blur correction is performed so as to compensate for this correction error with a lens-shift stabilization mechanism. Therefore, similar to for the first configuration, the blur range of an imaging apparatus for which image blur correction can be carried out by using a gimbal stabilization mechanism is widened. Further, since the image blur correction using the lens-shift stabilization mechanism is carried out in parallel, minute image blurring that could not be corrected with the gimbal stabilization mechanism can be corrected. Therefore, image blur correction performance can be improved.

Further, since minute image blurring that could not be corrected with the gimbal stabilization mechanism can be corrected with the lens-shift stabilization mechanism, even if the rotation position detection accuracy of the lens unit by the gimbal stabilization mechanism is rough, image blurring can be accurately corrected. Namely, even if position detection accuracy deteriorates due to the position detection sensor that detects the rotation position being brought closer to the rotation axis, the effect due to the deterioration in rotation position detection accuracy can be compensated for by the lens-shift stabilization mechanism, so that the gimbal stabilization mechanism can be made more compact.

Further, since the gimbal stabilization mechanism is specially adapted to correction of large image blurring, because the angular velocity used for correction can be reduced, this enables the torque of the actuator to be reduced, so that the gimbal stabilization mechanism can be made more compact.

In addition, with the second configuration, since there is not necessary to provide a blur detection unit on both the gimbal stabilization mechanism and the lens-shift stabilization mechanism, the costs of blur detection can be reduced.

8. Another Operation of the Image Blur Correction Control Unit According to the Second Configuration It is noted that when the image blur correction is performed using a plurality of image blur correction mechanisms, the image blur correction performed by one of the image blur correction mechanisms may be limited to a predetermined blur range, and the image blur correction of the portion exceeding the predetermined blur range may be performed by another of the image blur correction mechanisms.

Figure 13:
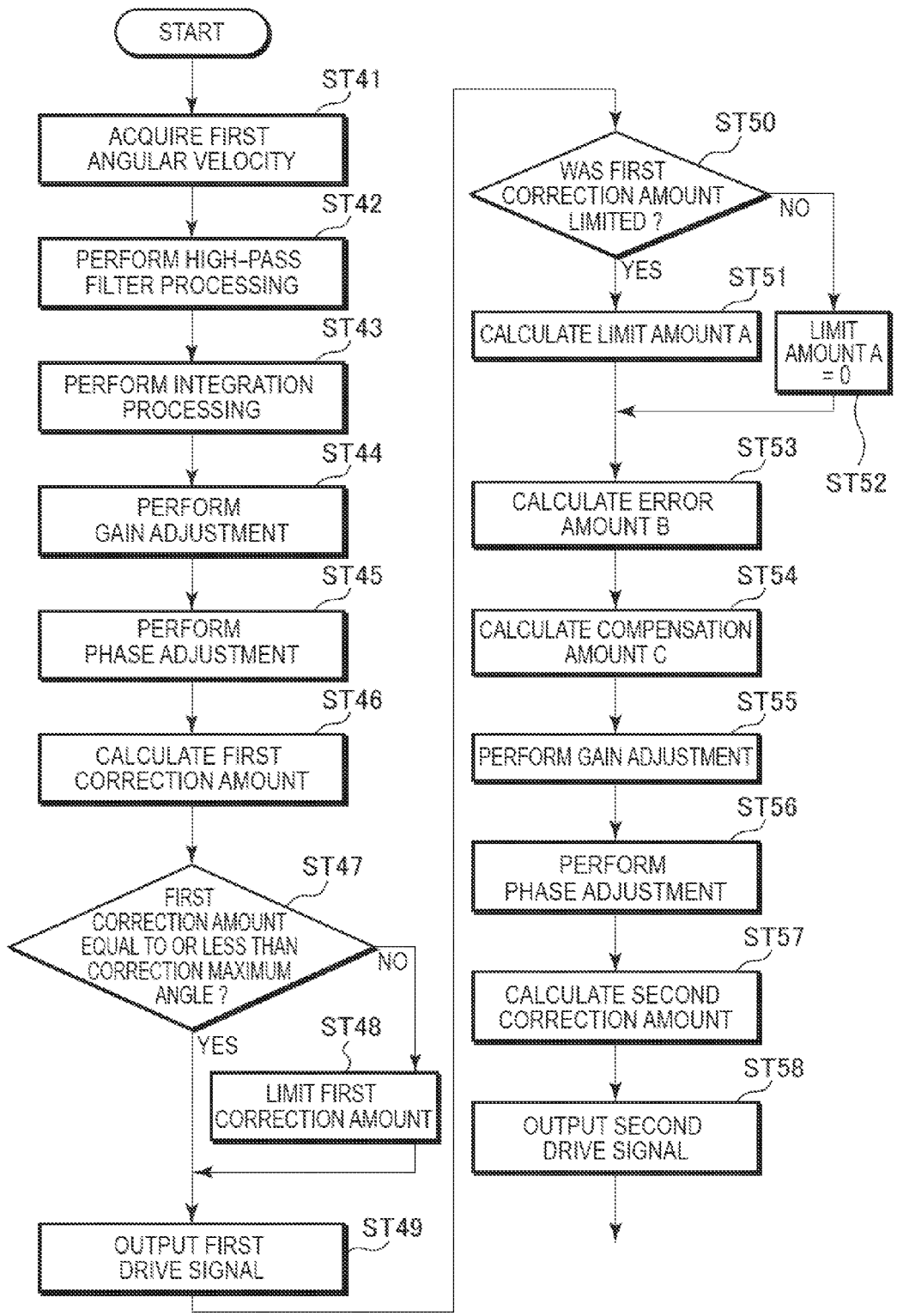
FIG. 13 is a flowchart illustrating another image blur correction operation according to the second configuration.

Next, as another operation according to the second configuration, a case will now be described in which the image blur correction performed by the gimbal stabilization mechanism is limited to a predetermined blur range, and the image blur correction of the portion exceeding the predetermined blur range is performed by the lens-shift stabilization mechanism. FIG. 13 is a flowchart illustrating another image blur correction operation according to the second configuration. In step ST41, the image blur correction control unit 90 acquires a first angular velocity. The image blur correction control unit 90 acquires an angular velocity, which is a detection result of a change in orientation in the yaw direction and the pitch direction of the imaging apparatus 10 from the first blur detection unit 811 that is configured using a first angular velocity sensor, for example, and the processing then proceeds to step ST42.

In step ST42, the image blur correction control unit 90 performs high-pass filter processing. The image blur correction control unit 90 performs high-pass filter processing on the angular velocity signal, removes the noise component and direct current component, and the processing then proceeds to step ST43.

In step ST43, the image blur correction control unit 90 performs integration processing. The image blur correction control unit 90 integrates the angular velocity signal subjected to high-pass filter processing, and the processing then proceeds to step ST44.

In step ST44, the image blur correction control unit 90 performs gain adjustment. The image blur correction control unit 90 adjusts the gain of the integration result, generates a signal representing the angular displacement of the imaging apparatus 10, and the processing then proceeds to step ST45.

In step ST45, the image blur correction control unit 90 performs phase adjustment. The image blur correction control unit 90 adjusts the phase of the signal representing the angular displacement, and the processing then proceeds to step ST46.

In step ST46, the image blur correction control unit 90 calculates the first correction amount. The image blur correction control unit 90 calculates the first correction amount based on the phase-adjusted signal of the signal representing the angular displacement, and the processing then proceeds to step ST47.

In step ST47, the image blur correction control unit 90 determines whether the first correction amount is equal to or less than a correction maximum angle. If the image blur correction control unit 90 determines that the first correction amount is equal to or less than the correction maximum angle, the processing proceeds to step ST49. If the image blur correction control unit 90 determines that the first correction amount is more than the correction maximum angle, the processing proceeds to step ST48.

In step ST48, the image blur correction control unit 90 limits the first correction amount. The image blur correction control unit 90 limits the first correction amount to the correction maximum angle, and the processing then proceeds to step ST49.

In step ST49, the image blur correction control unit 90 outputs a first drive signal. The image blur correction control unit 90 generates and outputs the first drive signal for driving the drive motors 191 and 192 of the gimbal stabilization mechanism 15 based on the first correction amount or the limited first correction amount, and the processing then proceeds to step ST50.

In step ST50, the image blur correction control unit 90 determines whether the first correction amount was limited. If the image blur correction control unit 90 determines that the first correction amount was limited, the processing proceeds to step ST51. If the image blur correction control unit 90 determines that the first correction amount was not limited, the processing proceeds to step ST52. For example, if the first correction amount is the correction maximum angle, the processing proceeds to step ST51.

In step ST51, the image blur correction control unit 90 calculates a limit amount A. The image blur correction control unit 90 calculates the correction amount that exceeds the correction maximum angle when the first correction amount was limited to the correction maximum angle, sets that calculated correction amount as limit amount A, and the processing then proceeds to step ST53.

In step ST52, the image blur correction control unit 90 sets the limit amount A to zero. The image blur correction control unit 90 sets the limit amount A to "0" based on the fact that the first correction amount was not limited, and the processing then proceeds to step ST53.

In step ST53, the image blur correction control unit 90 calculates an error amount B. The image blur correction control unit 90 calculates the error (rotation error of the lens unit 30) between the correction position and the current position, sets the calculated error as the error amount B, and the processing then proceeds to step ST54.

In step ST54, the image blur correction control unit 90 calculates a compensation amount C. The image blur correction control unit 90 calculates the compensation amount C based on the limit amount A and the error amount B. For example, the image blur correction control unit 90 adds the limit amount A and the error amount B, sets the addition product as the compensation amount C, and the processing then proceeds to step ST55.

In step ST55, the image blur correction control unit 90 performs gain adjustment. The image blur correction control unit 90 adjusts the gain of the compensation amount, generates a signal representing the angular displacement of the imaging apparatus 10 to be corrected by the lens-shift stabilization mechanism, and then the processing proceeds to step ST56.

In step ST56, the image blur correction control unit 90 performs phase adjustment. The image blur correction control unit 90 adjusts the phase of the signal representing the angular displacement, and then the processing proceeds to step ST57.

In step ST57, the image blur correction control unit 90 calculates the second correction amount. The image blur correction control unit 90 calculates the second correction amount based on the phase-adjusted signal of the signal representing the angular displacement, and then the processing proceeds to step ST58.

In step ST58, the image blur correction control unit 90 outputs the second drive signal. The image blur correction control unit 90 generates and outputs the second drive signal to be supplied to the coils 374 and 375 of the correction lens movement mechanism 41 in the lens-shift stabilization mechanism 35 based on the second correction amount.

By configuring in this manner, the image blur correction performed by the gimbal stabilization mechanism can be limited to a predetermined blur range, and the image blur correction of the portion exceeding the predetermined blur range can be performed by the lens-shift stabilization mechanism.

Next, a specific example of limiting the image blur correction performed by the gimbal stabilization mechanism to a predetermined blur range, and performing the image blur correction of the portion exceeding the predetermined blur range by the lens-shift stabilization mechanism. When performing image blur correction by providing the gimbal stabilization mechanism 15 and the lens-shift stabilization mechanism 35 in the imaging apparatus 10, since the gimbal stabilization mechanism 15 drives the lens unit 30, the gimbal stabilization mechanism 15 consumes more power than the lens-shift stabilization mechanism 35 that drives the correction lens 36. Therefore, the image blur correction control unit 90 limits the image blur correction performed by the gimbal stabilization mechanism 15 based on the remaining amount of the battery that operates the imaging apparatus. Namely, when the remaining amount in the battery is low, the image blur correction control unit 90 limits image blur correction performed by the gimbal stabilization mechanism 15 by reducing the blur correction range of the gimbal stabilization mechanism 15. Further, blurring that exceeds the limited blur correction range is corrected by the lens-shift stabilization mechanism 35. By performing such processing, the power consumed by image blur correction can be reduced, so that the duration that the imaging apparatus 10 can operate for can be lengthened.

Further, when the blurring occurring in the imaging apparatus 10 is small, the correction maximum angle of the gimbal stabilization mechanism 15 may be decreased. If the correction maximum angle of the gimbal stabilization mechanism is large when the blurring occurring in the imaging apparatus 10 is small, the lens-shift stabilization mechanism 35 can only compensate for the correction error produced by the gimbal stabilization mechanism 15, so that the image blur correction operation performed by the gimbal stabilization mechanism 15 is not capable of being limited. Namely, power consumption is not reduced. However, when the blurring occurring in the imaging apparatus 10 is small, if the correction maximum angle of the gimbal stabilization mechanism is decreased, the lens-shift stabilization mechanism 35 does not only compensate for the correction error produced by the gimbal stabilization mechanism 15, image blur correction can also be performed for the blurring that exceeds the correction maximum angle. Therefore, power consumption can be reduced.

In addition, if the correction maximum angle of the gimbal stabilization mechanism 15 is small when the blurring occurring in the imaging apparatus 10 is large, blurring that exceeds the correction maximum angle may exceed the correction range of the lens-shift stabilization mechanism 35. Therefore, when the blurring occurring in the imaging apparatus 10 is large, the correction maximum angle of the gimbal stabilization mechanism 15 is increased. It is noted that the correction maximum angle may be appropriately switched according to the blurring occurring in the imaging apparatus 10, and may also be switched based on the operation mode of the imaging apparatus 10.

By performing such processing, the power consumed by image blur correction can be reduced, so that the duration that the imaging apparatus 10 can operate for can be lengthened.

Figure 14:
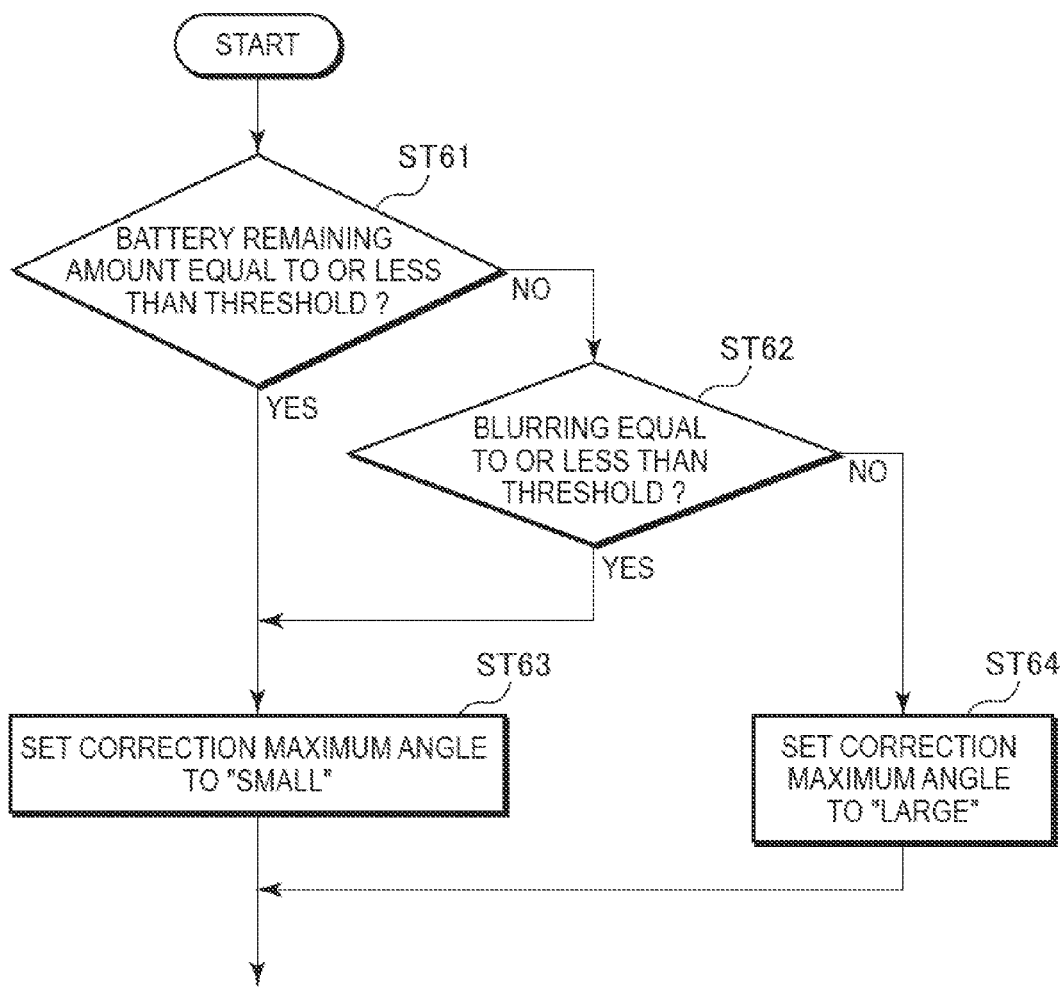
FIG. 14 is a flowchart illustrating a switching operation of a correction maximum angle.

FIG. 14 is a flowchart illustrating an operation for switching the correction maximum angle according to the blurring occurring in the imaging apparatus 10. In step ST61, the image blur correction control unit 90 determines whether a battery remaining amount is equal to or less than a threshold. If the image blur correction control unit 90 determines that the battery remaining amount is equal to or less than the threshold, the processing proceeds to step ST63, and if the image blur correction control unit 90 determines that the battery remaining amount is greater than the threshold, the processing proceeds to step ST62.

In step ST62, the image blur correction control unit 90 determines whether blurring is equal to or less than a threshold. If the image blur correction control unit 90 determines that blurring is equal to or less than the threshold, the processing proceeds to step ST63, and if the image blur correction control unit 90 determines that blurring is greater than the threshold, the processing proceeds to step ST64.

In step ST63, the image blur correction control unit 90 sets the correction maximum angle to "small". When the battery remaining amount is low or the blurring occurring in the imaging apparatus is small, the image blur correction control unit 90 sets the correction maximum angle to "small" so that the image blur correction is carried out using as much as possible the lens-shift stabilization mechanism, which consumes less power, rather than the gimbal stabilization mechanism.

In step ST64, the image blur correction control unit 90 sets the correction maximum angle to "large". When the battery remaining amount is greater than the threshold or the blurring occurring in the imaging apparatus is large, the image blur correction control unit 90 sets the correction maximum angle to "large" so that the image blur correction is carried out using the gimbal stabilization mechanism, which has a image blurring that is large correction range. It is noted that the processing illustrated in FIG. 14 may be performed, for example, before step ST47 of FIG. 13.

9. Other Imaging Apparatus Configurations and Operations

In the above-described imaging apparatus 10, although a case was described in which a lens-shift stabilization mechanism was used for the second correction unit, a sensor-shift stabilization mechanism that corrects image blur in a captured image by moving the image sensor of the imaging unit in a direction orthogonal to the light axis of the imaging optical system may also be used as the second correction unit.

Figure 15:
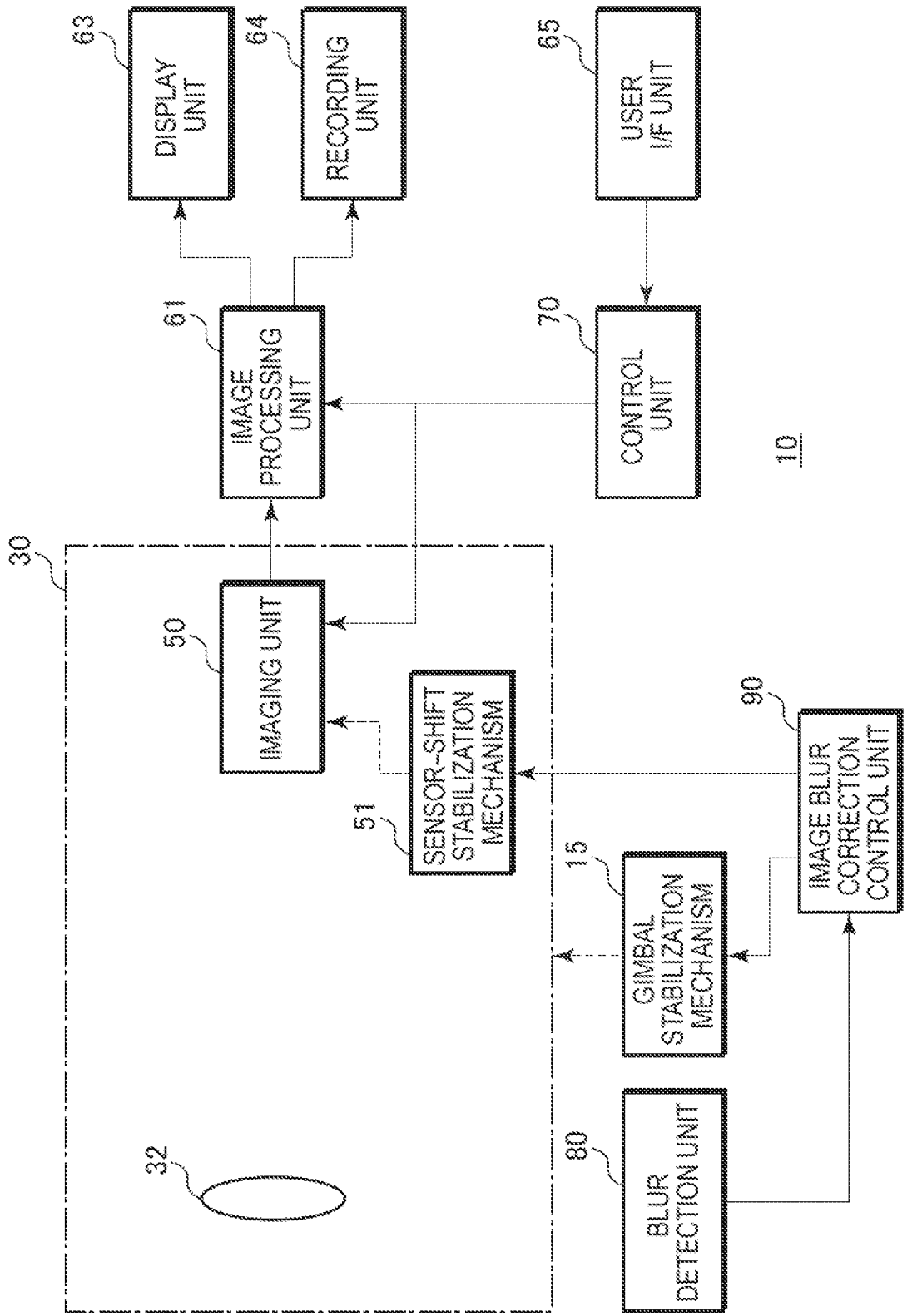
FIG. 15 is a diagram illustrating a configuration of an imaging apparatus that uses a sensor-shift stabilization mechanism.

FIG. 15 is a diagram illustrating a configuration of an imaging apparatus 10 that uses a sensor-shift stabilization mechanism. The imaging apparatus 10 has a lens unit 30, an image processing unit 61, a display unit 63, a recording unit 64, a user interface (I/F) unit 65, and a control unit 70. Further, the imaging apparatus 10 also has a gimbal stabilization mechanism 15, a blur detection unit 80, and an image blur correction control unit 90. In addition, an imaging optical system 32, an imaging unit 50, and a sensor-shift stabilization mechanism 51 that corrects image blur by moving the image sensor provided in the imaging unit in a direction orthogonal to the light axis of the imaging optical system 32 are provided in the lens unit 30.

The imaging optical system 32 is configured from a focus lens, a zoom lens and the like. In the imaging optical system 32 the focal distance can be changed by, for example, moving a zoom lens in the light axis direction. Further, focus adjustment is performed by moving the focus lens in the light axis direction.

The imaging unit 50 is configured from an image sensor, a pre-processing unit, an imaging drive unit and the like. The image sensor converts an optical image formed on an imaging plane into an electric signal with the imaging optical system 32 and the correction lens 36 by performing photoelectric conversion processing. As the image sensor, a CCD (charge-coupled device) image sensor or a CMOS (complementary metal-oxide semiconductor) image sensor is used, for example. As the pre-processing, noise removal processing, such as CDS (correlated double sampling), is performed on the electric signals generated by the image sensor. Further, gain adjustment for setting the signal level of the electric signals to a desired signal level is performed. In addition, in the pre-processing, an analog image signal, which is an electric signal on which noise removal and gain adjustment processing has been performed, is converted into a digital image signal by performing A/D conversion processing, and the converted digital signal is output to the image processing unit 61. The imaging drive unit generates the operation pulses used for driving the image sensor based on a control signal from the below-described control unit 70. For example, the imaging drive unit generates a charge read pulse for reading charge, a transfer pulse for transfer in the vertical direction and the horizontal direction, a shutter pulse for performing an electronic shutter operation and the like.

The sensor-shift stabilization mechanism 51 corrects image blur by moving the image sensor in the imaging unit 50 in an orthogonal direction to the light axis of the imaging optical system 32 based on a second drive signal from a below-described image blur correction control unit 90.

The gimbal stabilization mechanism 15 corrects image blur by, based on a first drive signal from the below-described image blur correction control unit 90, turning the lens unit 30 in the yaw direction and the pitch direction in the manner described above.

The image processing unit 61 performs camera process processing and the like on the digital image signal output from the imaging unit 50. The image processing unit 61 performs on the image signal, for example, non-linear processing such as gamma correction or Knee correction, color correction processing, contour enhancement processing and the like. The image processing unit 61 outputs the processed image signal to the display unit 63 and the recording unit 64.

The display unit 63 is configured using the above-described display panel unit 106 and finder unit 107. The display unit 63 performs, for example, display of a camera through image based on the image signal output from the image processing unit 61. Further, the display unit 63 also performs menu display and operation state display for performing operation setting of the imaging apparatus 10. It is noted that when the display pixel number is less than the captured image, the display unit 63 performs processing for converting the captured image into a display image of the display pixel number.

The recording unit 64 records the image signal output from the image processing unit 61 on a recording medium. Examples of the recording medium include a detachable recording medium such as a memory card, an optical disc, or a magnetic tape, and a fixed type HDD (hard disk drive) or semiconductor memory module. Further, an encoder and a decoder may be provided in the recording unit 64 so that an encoded signal is recorded on the recording medium by performing compression encoding and decompression decoding of the image signal. It is noted that recorded images can be displayed on the display unit 63 by, in the recording unit 64, reading the image signals and encoded signals recorded on the recording medium.

The user interface (I/F) unit 65 is configured from, for example, the zoom lever 102 and imaging button 103 illustrated in FIG. 1. The user interface unit 65 generates an operation signal based on a user operation, and outputs the generated operation signal to the control unit 70.

The control unit 70 includes a CPU (central processing unit), a ROM (read-only memory), and a RAM (random access memory), for example. The CPU reads and executes control programs stored in the ROM as necessary. In the ROM, programs that are executed by the CPU and data that is necessary in the various processing processes, for example, are pre-stored. The RAM is a memory that is used as a so-called working area for temporarily storing mid-processing results. Further, the ROM or the RAM stores information and correction data, such as various setting parameters. The control unit 70 makes the imaging apparatus 10 perform an operation according to a user operation by controlling the various units based on an operation signal, for example, from the user interface unit 65.

The blur detection unit 80 detects blurring occurring in the imaging apparatus 10 (the lens unit 30), and outputs the detection result to the image blur correction control unit 90.

The image blur correction control unit 90 generates a first drive signal based on the detection result from the blur detection unit 80, and supplies the generated first drive signal to the gimbal stabilization mechanism 15 and the sensor-shift stabilization mechanism 51, so that an image signal of the captured image in which image blurring has been corrected can be generated by the imaging unit 50. Further, based on the configuration illustrated in FIGS. 8 to 11, the image blur correction control unit 90 calculates a movement amount of the image sensor with the second correction amount calculation unit 922, and supplies a drive signal that drives the image sensor by only the calculated movement amount to the sensor-shift stabilization mechanism 51. By configuring in this manner, the same image blur correction as performed when using the lens-shift stabilization mechanism 35 can be carried out.

Figure 16:
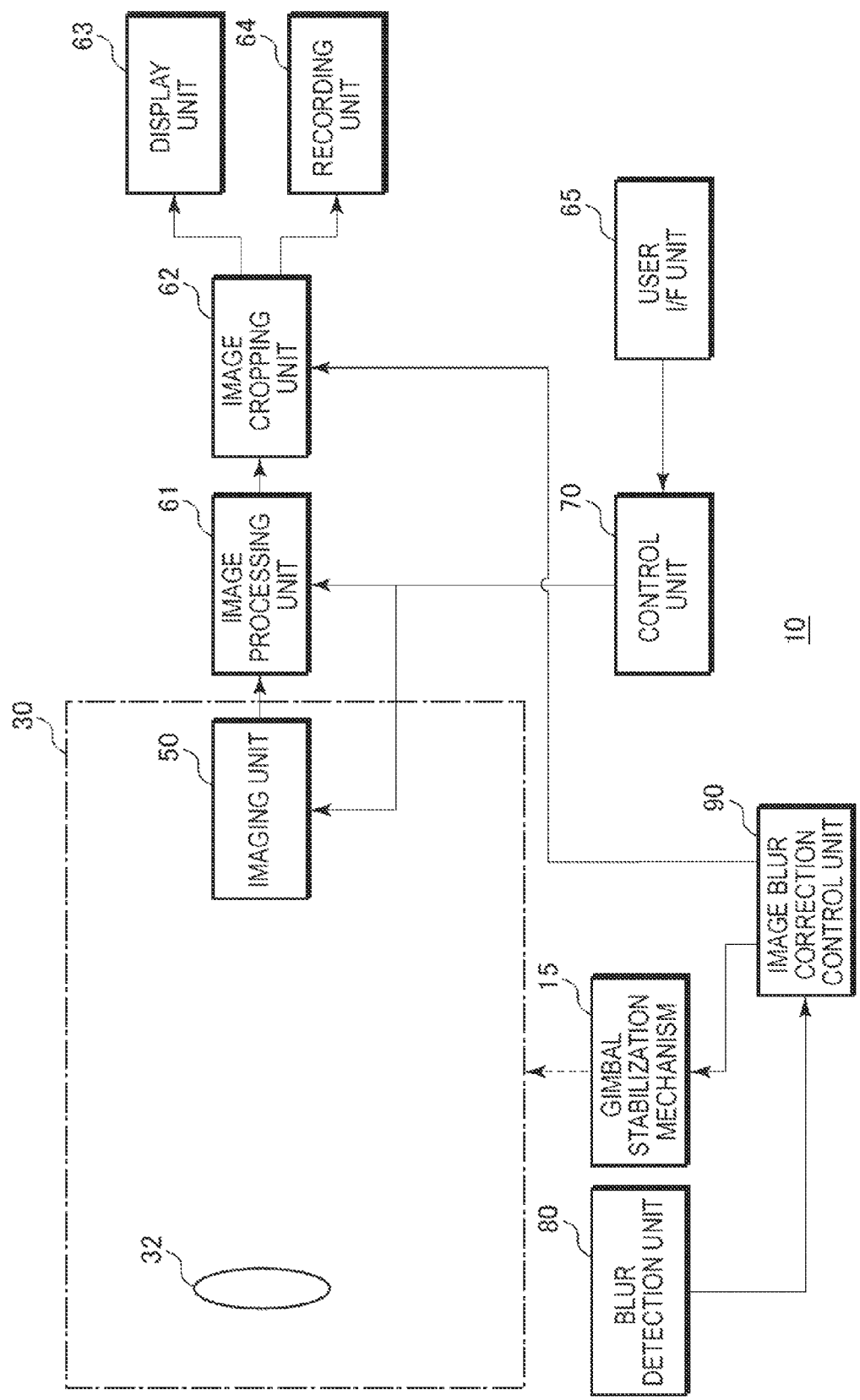
FIG. 16 is a diagram illustrating a configuration of an imaging apparatus that uses electronic image blur correction.

Further, electronic image blur correction can also be performed by the second correction unit. FIG. 16 is a diagram illustrating a configuration of an imaging apparatus that uses electronic image blur correction for the second correction unit. The imaging apparatus 10 has a lens unit 30, an image processing unit 61, an image cropping unit 62, a display unit 63, a recording unit 64, a user interface (I/F) unit 65, and a control unit 70. Further, the imaging apparatus 10 also has a gimbal stabilization mechanism 15, a blur detection unit 80, and an image blur correction control unit 90. In addition, an imaging optical system 32, an imaging unit 50, and a sensor-shift stabilization mechanism 51 that corrects image blur by moving the image sensor provided in the imaging unit in a direction orthogonal to the light axis of the imaging optical system 32 are provided in the lens unit 30.

The imaging optical system 32 is configured from a focus lens, a zoom lens and the like. In the imaging optical system 32 the focal distance can be changed by, for example, moving a zoom lens in the light axis direction. Further, focus adjustment is performed by moving the focus lens in the light axis direction.

The imaging unit 50 is configured from an image sensor, a pre-processing unit, an imaging drive unit and the like. The image sensor converts an optical image formed on an imaging plane into an electric signal with the imaging optical system 32 and the correction lens 36 by performing photoelectric conversion processing. As the image sensor, a CCD (charge-coupled device) image sensor or a CMOS (complementary metal-oxide semiconductor) image sensor is used, for example. As the pre-processing, noise removal processing, such as CDS (correlated double sampling), is performed on the electric signals generated by the image sensor. Further, gain adjustment for setting the signal level of the electric signals to a desired signal level is performed. In addition, in the pre-processing, an analog image signal, which is an electric signal on which noise removal and gain adjustment processing has been performed, is converted into a digital image signal by performing A/D conversion processing, and the converted digital signal is output to the image processing unit 61. The imaging drive unit generates the operation pulses used for driving the image sensor based on a control signal from the below-described control unit 70. For example, the imaging drive unit generates a charge read pulse for reading charge, a transfer pulse for transfer in the vertical direction and the horizontal direction, a shutter pulse for performing an electronic shutter operation and the like.

The gimbal stabilization mechanism 15 corrects image blur by, based on a first drive signal from the below-described image blur correction control unit 90, turning the lens unit 30 in the yaw direction and the pitch direction in the manner described above.

The image processing unit 61 performs camera process processing and the like on the digital image signal output from the imaging unit 50. The image processing unit 61 performs on the image signal, for example, non-linear processing such as gamma correction or Knee correction, color correction processing, contour enhancement processing and the like. The image processing unit 61 outputs the processed image signal to the image cropping unit 62.

The image cropping unit 62 performs signal processing on the image signal supplied from the image processing unit 61 that crops the signal of an image cropping area, and outputs the cropped image signal to the display unit and the recording unit 64. Further, based on a second drive signal from the image blur correction control unit 90, the image cropping unit 62 changes the cropping area of the image based on blurring, and outputs the image signal in which image blur has been corrected.

The display unit 63 is configured using the above-described display panel unit 106 and finder unit 107. The display unit 63 performs, for example, display of a camera through image based on the image signal output from the image cropping unit 62. Further, the display unit 63 also performs menu display and operation state display for performing operation setting of the imaging apparatus 10. It is noted that when the display pixel number is less than the captured image, the display unit 63 performs processing for converting the captured image into a display image of the display pixel number.

The recording unit 64 records the image signal output from the image cropping unit 62 on a recording medium. Examples of the recording medium include a detachable recording medium such as a memory card, an optical disc, or a magnetic tape, and a fixed type HDD (hard disk drive) or semiconductor memory module. Further, an encoder and a decoder may be provided in the recording unit 64 so that an encoded signal is recorded on the recording medium by performing compression encoding and decompression decoding of the image signal. It is noted that recorded images can be displayed on the display unit 63 by, in the recording unit 64, reading the image signals and encoded signals recorded on the recording medium.

The user interface (I/F) unit 65 is configured from, for example, the zoom lever 102 and imaging button 103 illustrated in FIG. 1. The user interface unit 65 generates an operation signal based on a user operation, and outputs the generated operation signal to the control unit 70.

The control unit 70 includes a CPU (central processing unit), a ROM (read-only memory), and a RAM (random access memory), for example. The CPU reads and executes control programs stored in the ROM as necessary. In the ROM, as described above, programs that are executed by the CPU and data that is necessary in the various processing processes, for example, are pre-stored. The RAM is a memory that is used as a so-called working area for temporarily storing mid-processing results. Further, the ROM or the RAM stores information and correction data, such as various setting parameters. The control unit 70 makes the imaging apparatus perform an operation according to a user operation by controlling the various units based on an operation signal, for example, from the user interface unit 65.

The blur detection unit 80 detects blurring occurring in the imaging apparatus 10 (the lens unit 30), and outputs the detection result to the image blur correction control unit 90.

The image blur correction control unit 90 generates a first drive signal based on the detection result from the blur detection unit 80, and supplies the generated first drive signal to the gimbal stabilization mechanism 15, so that an image signal in which image blurring has been corrected can be generated by the imaging unit 50. Further, based on the configuration illustrated in FIGS. 8 to 11, the image blur correction control unit 90 calculates an image cropping area as a second correction amount with the second correction amount calculation unit 922. The second drive signal generation unit 923 outputs a signal indicating the calculated image cropping area to the image cropping unit 62 as a second drive signal.

By configuring in this manner, similar to when the gimbal stabilization mechanism 15 and the lens-shift stabilization mechanism 35 are used, the image blur correction performance can be improved. Further, performing electronic image blur correction with the second correction unit removes the need for a mechanism that moves the correction lens 36 or the imaging unit 50 image sensor, so that the moving portions in the imaging apparatus can be reduced.

In addition, in the embodiments of the present disclosure described above, although a case was described in which blurring in the imaging apparatus (lens unit) was detected by configuring the blur detection unit from a blur detection sensor such as an angular velocity sensor, the imaging apparatus 10 may also detect blurring from the captured image. For example, the image processing unit 61 performs signal processing for detecting global movement between frame images using an image signal of a captured image generated by the imaging unit 50. The image processing unit 61 then outputs the detected global movement to the image blur correction control unit 90. The image blur correction control unit 90 performs image blur correction by calculating a correction amount based on the global movement, for example.

The series of processes described in present disclosure can be executed by hardware, software, or even a combination of both hardware and software. When executing the processing with software, a program in which the processing sequence is recorded is installed and executed in a memory in a computer provided with dedicated hardware. Further, this processing may also be executed by installing a program in a versatile computer that is capable of executing various processes.

For example, the program may be pre-recorded on a hard disk or as a recording medium or in a ROM (read-only memory). Alternatively, the program may be temporarily or permanently stored (recorded) in a removable recording medium such as a flexible disk, a CD-ROM (compact disc read-only memory), a MO (magneto-optical) disk, a DVD (digital versatile disc), a magnetic disk, a semiconductor memory card and the like. Such a removable recording medium can be provided as so-called packaged software.

Further, in addition to being installed in a computer from a removable recording medium, the program can also be transferred wirelessly or through a wire to a computer via a network, such as a LAN (local area network) or the Internet. The thus-transferred program is can be received by the computer, and installed in an internal recording medium, such as a hard disk.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image blur correction apparatus including:

a lens unit that has an imaging optical system and an imaging unit configured to generate an image signal of a captured image;

a blur detection unit configured to detect blurring occurring in the lens unit;

a first correction unit configured to perform image blur correction by turning the lens unit in a first direction, which is a direction about a first pivot axis that is orthogonal to a light axis of the imaging optical system, and in a second direction, which is a direction about a second pivot axis that is orthogonal to the light axis and the first pivot axis;

a second correction unit configured to perform image blur correction on a captured image obtained by the imaging optical system; and an image blur correction control unit configured to drive the first correction unit and the second correction unit based on blurring detected by the blur detection unit.

(2) The image blur correction apparatus according to (1), wherein the image blur correction control unit is configured to acquire position information indicating a position of the lens unit from the first correction unit, calculate an error between the position of the lens unit and a correction position in image blur correction performed by the first correction unit, and drive the second correction unit based on the calculated error.

(3) The image blur correction apparatus according to (2), wherein the image blur correction control unit is configured to limit image blur correction performed by the first correction unit to a predetermined blur range, and cause the second correction unit to perform image blur correction on blurring that is beyond the predetermined blur range.

(4) The image blur correction apparatus according to (3), wherein the image blur correction control unit is configured to set the predetermined blur range based on blurring occurring in the lens unit.

(5) The image blur correction apparatus according to (3) or (4), wherein the image blur correction control unit is configured to set the predetermined blur range based on a remaining amount of a battery that drives the image blur correction apparatus.

(6) The image blur correction apparatus according to any one of (1) to (5), wherein the blur detection unit has a first blur detection unit and a second blur detection unit, and wherein the image blur correction control unit is configured to drive the first correction unit based on blurring detected by the first blur detection unit, and drive the second correction unit based on blurring detected by the second blur detection unit.

(7) The image blur correction apparatus according to (6), wherein the first blur detection unit is arranged at a position excluding the lens unit in the image blur correction apparatus to detect blurring, and the second blur detection unit is arranged on the lens unit to detect blurring.

(8) The image blur correction apparatus according to (6), wherein the first blur detection unit is configured to detect blur based on image blur correction performance of the first correction unit, and the second blur detection unit is configured to detect blur based on image blur correction performance of the second correction unit.

(9) The image blur correction apparatus according to any one of (1) to (8), wherein the second correction unit is configured to perform image blur correction on the captured image by driving a correction lens provided in the lens unit in a direction orthogonal to the light axis of the imaging optical system.

(10) The image blur correction apparatus according to any one of (1) to (9), wherein the second correction unit is configured to perform image blur correction on the captured image by driving the imaging unit in a direction orthogonal to the light axis of the imaging lens.

(11) The image blur correction apparatus according to any one of (1) to (10), wherein the second correction unit is configured to perform image blur correction on the captured image by performing image cropping using an image signal generated by the imaging unit, and changing an image cropping area.

In the image blur correction apparatus, the image blur correction method, and the imaging apparatus according to an embodiment of the present technology, image blur correction is performed by detecting with a blur detection unit blurring occurring in a lens unit having an imaging optical system and an imaging unit that generates an image signal of a captured image, and turning a lens unit in a first direction, which is a direction about a first pivot axis that is orthogonal to a light axis of the imaging optical system, and in a second direction, which is a direction about a second pivot axis that is orthogonal to the light axis and the first pivot axis, by driving a first correction unit with an image blur correction control unit based on the detected blurring. Further, image blur correction is also performed on the captured image obtained by the imaging optical system by driving a second correction unit with the image blur correction control unit based on the detected blurring. Consequently, not only can the image blur correction range be widened by the first correction unit, but even when an error occurs in the image blur correction by the first correction unit, the error can be compensated for by the second correction unit, so that the image blur correction range capable of obtaining a good corrected image can be widened. Therefore, such an image blur correction apparatus can be applied in an imaging apparatus such as a video camera and a still camera, or a mobile telephone or a communications terminal device having an imaging function.

What is claimed is:

1. An image blur correction apparatus comprising:
   a lens unit that has an imaging optical system and an imaging unit configured to generate an image signal of a captured image;
   a blur detection unit configured to detect blurring occurring in the blur correction apparatus;
   a first correction unit configured to perform image blur correction by turning the lens unit in a first direction, which is a direction about a first pivot axis that is orthogonal to a light axis of the imaging optical system, and in a second direction, which is a direction about a second pivot axis that is orthogonal to the light axis and the first pivot axis;
   a second correction unit configured to perform image blur correction on an image obtained by the imaging optical system; and
   an image blur correction control unit configured to operate the first correction unit and the second correction unit based on blurring detected by the blur detection unit.

2. The image blur correction apparatus according to claim 1, wherein the image blur correction control unit is configured to acquire position information indicating a position of the lens unit from the first correction unit, calculate an error between the position of the lens unit and a correction position in image blur correction performed by the first correction unit, and drive the second correction unit based on the calculated error.

3. The image blur correction apparatus according to claim 2, wherein the image blur correction control unit is configured to limit image blur correction performed by the first correction unit to a predetermined blur range, and cause the second correction unit to perform image blur correction on blurring that is beyond the predetermined blur range.

4. The image blur correction apparatus according to claim 3, wherein the image blur correction control unit is configured to set the predetermined blur range based on blurring occurring in the lens unit.

5. The image blur correction apparatus according to claim 3, wherein the image blur correction control unit is configured to set the predetermined blur range based on a remaining amount of a battery that drives the image blur correction apparatus.

6. The image blur correction apparatus according to claim 1,
   wherein the blur detection unit has a first blur detection unit and a second blur detection unit, and
   wherein the image blur correction control unit is configured to drive the first correction unit based on blurring detected by the first blur detection unit, and operate the second correction unit based on blurring detected by the second blur detection unit.

7. The image blur correction apparatus according to claim 6, wherein the first blur detection unit is arranged at a position excluding the lens unit in the image blur correction apparatus to detect blurring, and the second blur detection unit is arranged on the lens unit to detect blurring.

8. The image blur correction apparatus according to claim 6, wherein the first blur detection unit is configured to detect blur based on image blur correction performance of the first correction unit, and the second blur detection unit is configured to detect blur based on image blur correction performance of the second correction unit.

9. The image blur correction apparatus according to claim 1, wherein the second correction unit is configured to perform image blur correction on the image by driving a correction lens provided in the lens unit in a direction orthogonal to the light axis of the imaging optical system.

10. The image blur correction apparatus according to claim 1, wherein the second correction unit is configured to perform image blur correction on the image by driving the imaging unit in a direction orthogonal to the light axis of the imaging lens.

11. The image blur correction apparatus according to claim 1, wherein the second correction unit is configured to perform image blur correction on the captured image by performing image cropping using an image signal generated by the imaging unit, and changing an image cropping area.

12. An image blur correction method comprising:
- detecting blurring occurring in a lens unit that has an imaging optical system and an imaging unit configured to generate an image signal of a captured image; and
- driving, based on the detected blurring, a first correction unit that is configured to perform image blur correction by turning the lens unit in a first direction, which is a direction about a first pivot axis that is orthogonal to a light axis of the imaging optical system, and in a second direction, which is a direction about a second pivot axis that is orthogonal to the light axis and the first pivot axis, and a second correction unit that is configured to perform image blur correction on a captured image obtained by the imaging optical system.

13. An imaging apparatus comprising:
- a lens unit that has an imaging optical system and an imaging unit configured to generate an image signal of a captured image;
- a blur detection unit configured to detect blurring occurring in the lens unit;
- a first correction unit configured to perform image blur correction by turning the lens unit in a first direction, which is a direction about a first pivot axis that is orthogonal to a light axis of the imaging optical system, and in a second direction, which is a direction about a second pivot axis that is orthogonal to the light axis and the first pivot axis;
- a second correction unit configured to perform image blur correction on a captured image obtained by the imaging optical system;
- an image blur correction control unit configured to operate the first correction unit and the second correction unit based on blurring detected by the blur detection unit; and
- a signal processing unit configured to perform signal processing of an image signal generated by the imaging unit.

* * * * *